(12) United States Patent
Takeuchi

(10) Patent No.: US 7,830,104 B2
(45) Date of Patent: Nov. 9, 2010

(54) BRUSHLESS MOTOR

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 281 days.

(21) Appl. No.: 11/900,048

(22) Filed: Sep. 7, 2007

(65) Prior Publication Data

US 2008/0074068 A1   Mar. 27, 2008

(30) Foreign Application Priority Data

Sep. 19, 2006 (JP) ............................. 2006-253083
Dec. 7, 2006 (JP) ............................. 2006-330431
Apr. 5, 2007 (JP) ............................. 2007-099543
Apr. 26, 2007 (JP) ............................. 2007-117234

(51) Int. Cl.
*H02P 6/00* (2006.01)
(52) U.S. Cl. ............................. 318/400.01; 318/400.38; 318/599; 318/811
(58) Field of Classification Search ............ 318/400.01, 318/400.21, 400.22, 400.38, 911, 599, 811
See application file for complete search history.

(56) References Cited

U.S. PATENT DOCUMENTS

| | | | |
|---|---|---|---|
| 4,472,666 A * | 9/1984 | Akeda et al. ........... | 318/400.21 |
| 5,023,531 A * | 6/1991 | Altemose et al. ........... | 318/471 |
| 5,963,706 A * | 10/1999 | Baik ........................... | 388/804 |
| 6,545,438 B1 * | 4/2003 | Mays, II ................. | 318/400.01 |
| 6,710,558 B1 | 3/2004 | Mack et al. | |
| 6,777,844 B2 * | 8/2004 | Selewski et al. ............ | 310/193 |
| 6,986,260 B2 * | 1/2006 | Oda et al. ..................... | 62/179 |
| 2006/0120903 A1 * | 6/2006 | Iwasaki et al. ........... | 417/423.1 |

FOREIGN PATENT DOCUMENTS

| | | |
|---|---|---|
| JP | 08-047283 | 2/1996 |
| JP | 10-225176 | 8/1998 |
| JP | 2001-298982 | 10/2001 |

* cited by examiner

*Primary Examiner*—Rina I Duda
(74) *Attorney, Agent, or Firm*—Harness, Dickey & Pierce, P.L.C.

(57) ABSTRACT

The brushless motor includes a coil array, a magnet array, a magnetic sensor, a drive control circuit for driving the coil array, and a temperature sensor for detecting a detection target temperature associated with either the coil temperature or the driving element temperature. The drive control circuit reduces the effective value of driving voltage supplied to the coil array when coil temperature detected by the temperature sensor has exceeded a prescribed threshold value.

12 Claims, 23 Drawing Sheets phase = 0 or 2π phase = π/2 phase = π phase = 3π/2

Magnetic sensor outputs SSA,SSB

Driving voltage

DRVA1+DRVA2

DRVB1+DRVB2

$Y = a \cdot X + b$
or
$Y = a(X + b)$

DRVA1+DRVA2    Ma=0

DRVA1+DRVA2    Ma=+10    Ma=−10

DRVA1+DRVA2    Ma=+30    Ma=−30

DRVA1+DRVA2    Ma=+60    Ma=−60

Fig.7A SSA
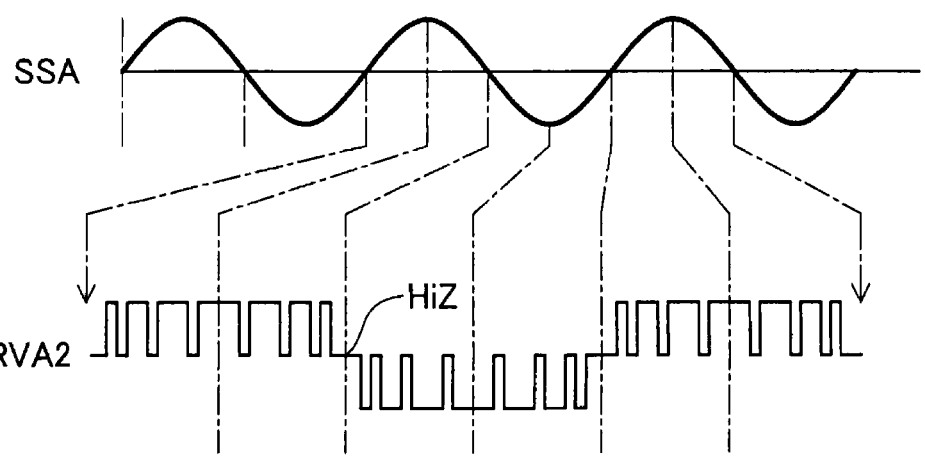
Fig.7B DRVA1+DRVA2
Fig.7C
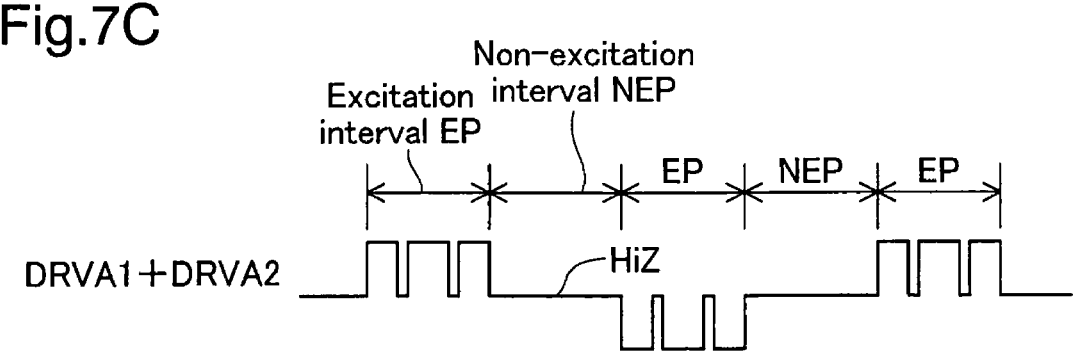
DRVA1+DRVA2

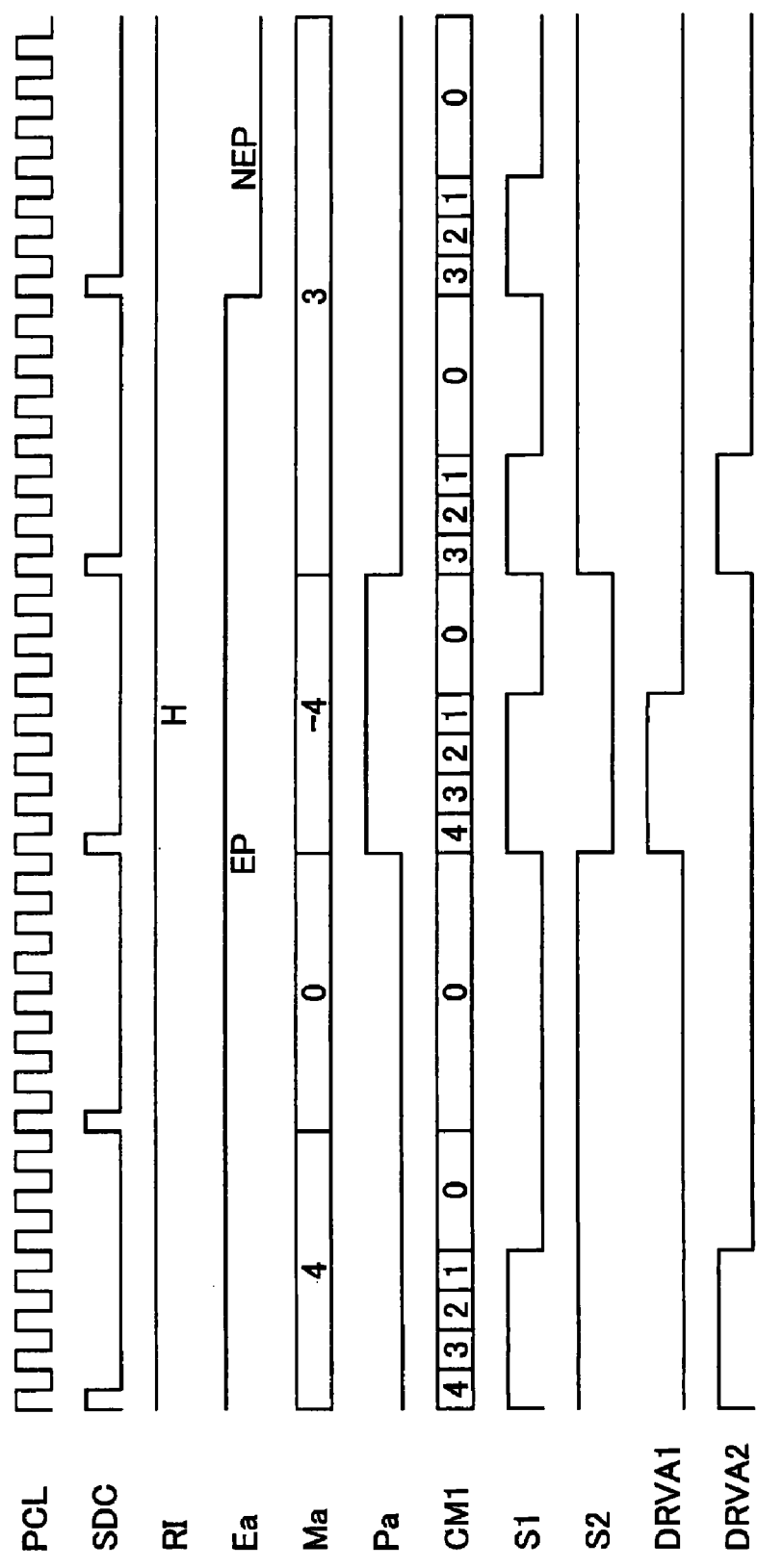

DRVA1+DRVA2    Ma=0

DRVA1+DRVA2    Ma=+10    Ma=−10

DRVA1+DRVA2    Ma=+30    Ma=−30

DRVA1+DRVA2    Ma=+60    Ma=−60

Conventional overcurrent limiting circuit

BRUSHLESS MOTOR

CROSS-REFERENCE TO RELATED APPLICATIONS

The present application claims the priority based on Japanese Patent Applications No. 2006-253083 filed on Sep. 19, 2006, No. 2006-330431 filed on Dec. 7, 2006, No. 2007-99543 filed on Apr. 5, 2007, and No. 2007-117234 filed on Apr. 26, 2007, the disclosures of which are hereby incorporated by reference in its entirety.

BACKGROUND OF THE INVENTION

1. Field of the Invention

The present invention relates to drive control technology for a brushless motor.

2. Description of the Related Art

One brushless motor known in the art to date is that disclosed in JPA 2001-298982, for example.

In conventional brushless motors, it is common practice to employ a rectangular waveform for the drive signal. Where a drive signal of rectangular waveform is used, there is a risk that the motor will overheat due to overcurrent generated when the drive signal reverses polarity. Thus, conventional brushless motors are typically provided with a circuit for limiting overcurrent.

FIG. 23 illustrates one example of an overcurrent limiting circuit used in a conventional brushless motor. In this circuit, an overcurrent detection transistor PT and an overcurrent sensor ECS are provided on the ground side of a bridge circuit HB which drives the coil C of the brushless motor. When overcurrent flows to the bridge circuit HB, the overcurrent sensor ECS will detect the flow of overcurrent. Then, in response to an output signal from the overcurrent sensor ECS, the drive circuit will limit the application voltage or application current to the coil C.

Preferably, such limiting of overcurrent will properly take place only during abnormal circumstances, such as where a load has become excessively large. However, since current flow is rather high during startup of the motor, the current limiting function may kick in during startup, resulting in undue limiting of current. Where current is limited during startup in this way, a resultant problem is that adequate torque will not be produced in some instances.

SUMMARY OF THE INVENTION

An object of the present invention is to provide a technology whereby overheating of a motor will be prevented, without unduly limiting current.

A brushless motor according to one aspect of the present invention comprises: a coil array having a plurality of magnet coils; a magnet array having a plurality of permanent magnets; a magnetic sensor for detecting relative position of the magnet array and the coil array; a drive control circuit for utilizing an output of the magnetic sensor and driving the coil array using a driving element; and a temperature sensor for detecting a detection target temperature associated with either a coil temperature of the coil array or a temperature of the driving element. The drive control circuit reduces an effective value of driving voltage supplied to the coil array when the detection target temperature detected by the temperature sensor has exceeded a prescribed first threshold value.

According to this brushless motor, if the detection target temperature detected by a temperature sensor has gone above a prescribed first threshold value, the effective value of driving voltage supplied to the coil array will be reduced, thus eliminating undue limiting of current at startup, as can occur where an overcurrent limiting circuit is provided in the conventional manner; as well as preventing overheating of the motor.

The drive control circuit may halt supply of the driving voltage to the coil array when the detection target temperature exceeds the prescribed first threshold value.

With this configuration, overheating of the coil can be reliably prevented.

The drive control circuit may include: a driver circuit including a plurality of drive transistors for supplying electrical current to the coil array; and a drive signal generating circuit for generating a drive signal that controls the plurality of drive transistors of the driver circuit. The drive signal generating circuit may include: an overheat limiting circuit for generating, based on the output of the temperature sensor, an overheat limiting signal indicating whether or not the detection target temperature has exceeded the prescribed first threshold value; an excitation interval setter for setting, based on at least the overheat limiting signal, an excitation interval during which the coil array will be excited, and a non-excitation interval during which the coil array will not be excited; and a PWM control circuit for executing PWM control utilizing analog change in the output of the magnetic sensor, and supplying a PWM signal to the bridge circuit during the excitation interval while halting supply of the PWM signal during the non-excitation interval. The excitation interval setter may shorten the excitation interval and extend the non-excitation interval when the overheat limiting signal indicates that the detection target temperature has exceeded the prescribed first threshold value.

With this configuration, overheating of the motor will be prevented by modifying the settings of the excitation interval and non-excitation interval.

The excitation interval setter may set the excitation interval and the non-excitation interval based on not only the overheat limiting signal, but also an externally provided control value of operating voltage of the brushless motor.

With this configuration, motor output will be adjusted through proper setting of the excitation interval; and overheating of the coil will be prevented easily, even where detection target temperature has risen above the first threshold value.

The excitation interval setter may include: a first interval setting section for setting the excitation interval and the non-excitation interval based on the control value of operating voltage of the brushless motor, and outputting an excitation interval signal that indicates the excitation interval and the non-excitation interval; and a logic circuit for taking a logical AND of the excitation interval signal and the overheat limiting signal, and presenting the result of the logical AND operation to the PWM control circuit.

The temperature sensor may be included within a power semiconductor element on which the driving element is mounted.

With this configuration, since the temperature of the driving element can be monitored accurately, overheating of a motor can be prevented without undue limiting of current.

The temperature sensor may be disposed on a radiator member provided to the driving element.

With this configuration, since the temperature of the radiator member will be monitored, overheating of the driving element of the motor will be appropriately prevented.

A brushless motor according to another aspect of the present invention comprises: a coil array having a plurality of magnet coils; a magnet array having a plurality of permanent magnets; a magnetic sensor for detecting relative position of the magnet array and the coil array; a drive control circuit for utilizing an output of the magnetic sensor and driving the coil array using a driving element; and a temperature sensor for detecting a detection target temperature associated with either a coil temperature of the coil array or a temperature of the driving element. The drive control circuit reduces the effective value of driving voltage supplied to the coil array, when the detection target temperature detected by the temperature sensor has exceeded the prescribed first threshold value, and adjusts the driving voltage such that the reduction of the effective value will be greater the higher the detection target temperature.

According to this brushless motor, if the detection target temperature detected by a temperature sensor has gone above a prescribed first threshold value, the effective value of driving voltage supplied to the coil array will be reduced, thus eliminating undue limiting of current at startup, as can occur where an overcurrent limiting circuit is provided in the conventional manner; as well as preventing overheating of the motor. Moreover, since the driving voltage is adjusted in such a way that the extent of reduction of the effective value increases with increase of the detection target temperature, it will be possible to appropriately adjust the driving voltage even in the event that temperature has risen during rotation of the motor.

The drive control circuit may halt supply of driving voltage to the coil array when the detection target temperature has exceeded a prescribed second threshold value greater than the first threshold value.

With this configuration, overheating of the coil will be reliably prevented.

The drive control circuit may include: a driver circuit including a plurality of drive transistors for supplying electrical current to the coil array; and a drive signal generating circuit for generating a drive signal that controls the plurality of drive transistors of the driver circuit. The drive signal generating circuit may include: a temperature monitoring circuit for generating, based on the output of the temperature sensor, a temperature monitoring signal whose signal level changes depending on the detection target temperature; a waveform signal generator for generating, based on at least the temperature monitoring signal and the output of the magnetic sensor, a waveform signal that exhibits change identical to analog change in the output of the magnetic sensor, and having amplitude proportional to a signal level of the temperature monitoring signal; and a PWM control circuit for executing PWM control utilizing the waveform signal, and generating the drive signal which exhibits change in effective voltage identical to change in the waveform signal.

With this configuration, overheating of the motor will be appropriately prevented by varying the amplitude of the waveform signal used in PWM, depending on the detection target temperature.

The waveform signal generator may set an amplitude of the waveform signal based on not only the temperature monitoring signal, but also an externally provided control value of operating voltage of the brushless motor.

With this configuration, the output of the motor will be adjusted appropriately with reference to both the operating voltage control value and detection target temperature.

The present invention may be reduced to practice in various modes such as, for example, a brushless motor and method of controlling (or method of driving) the same; or an actuator, electronic device, household electrical appliance, or a moving body employing these.

BRIEF DESCRIPTION OF THE DRAWINGS

FIGS. 7A to 7C show correspondence relationships between sensor output waveforms and drive signal waveforms;

FIG. 10 is a timing chart depicting operation of the PWM unit during reverse rotation of the motor;

DESCRIPTION OF THE PREFERRED EMBODIMENT

Next, the embodiments of the present invention will be discussed in the order indicated below.

A. Motor Configuration and Overview of Operation
B. Configuration of Drive Control Circuit
C. Other Embodiments
D. Modification Examples

A. Motor Configuration and Overview of Operation

Figure 1A:
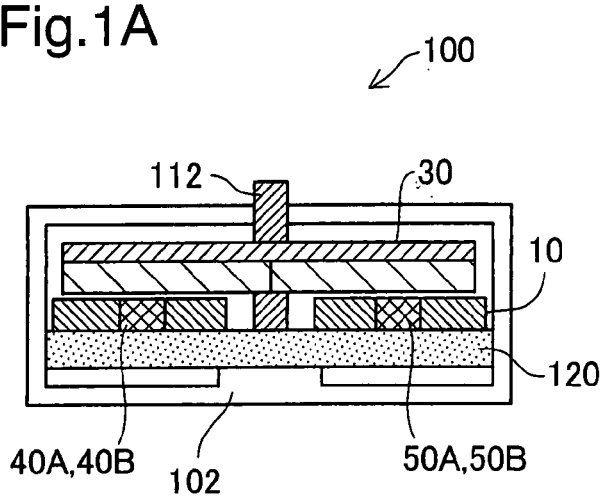
FIGS. 1A to 1C show in sectional view the motor unit of the brushless motor of Embodiment 1.
Figure 1B:
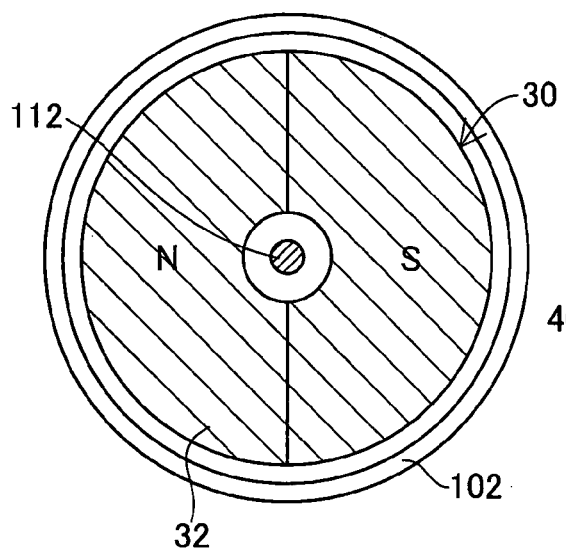
Figure 1C:
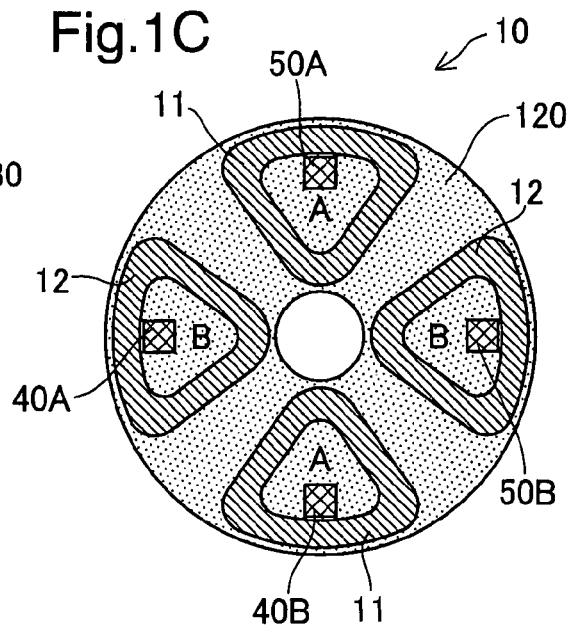

FIGS. 1A to 1C show in sectional view the motor unit of the brushless motor pertaining to a first embodiment of the present invention. This motor unit 100 has a stator portion 10 and a rotor portion 30, each having contours of generally disk shape. The stator portion 10 (FIG. 1C) has two sets of magnet coils 11, 12, two magnetic sensors 40A, 40B, and two temperature sensors 50A, 50B, which are disposed on a circuit board 120. The first magnetic sensor 40A is the sensor for use with the first set of coils 11; the second magnetic sensor 40B is the sensor for use with the second set of coils 12. Herein, the two sets of magnet coils 11, 12 will be termed the "phase A coils 11" and the "phase B coils 12."

The first temperature sensor 50A is a sensor for measuring the temperature of the phase A coils 11, while the second temperature sensor 50B is a sensor for measuring the temperature of the phase B coils 12. In preferred practice these temperature sensors 50A, 50B will be positioned in a state of contact with the coils 11, 12; alternatively, they may be positioned in proximity to the coils 11, 12. Also, it is preferable to provided at least one temperature sensor for the coil groups of each phase. This makes it possible to prevent overheating of the coils if a high level of electrical current flows to the coils of any phase.

The rotor portion 30 (FIG. 1B) is furnished with two magnets 32; the center axis of the rotor portion 30 constitutes a rotating shaft 112. The direction of magnetization of these magnets 32 is the perpendicular to the plane of the paper in FIG. 1B; this corresponds to the vertical direction in FIG. 1A.

Figure 2A:
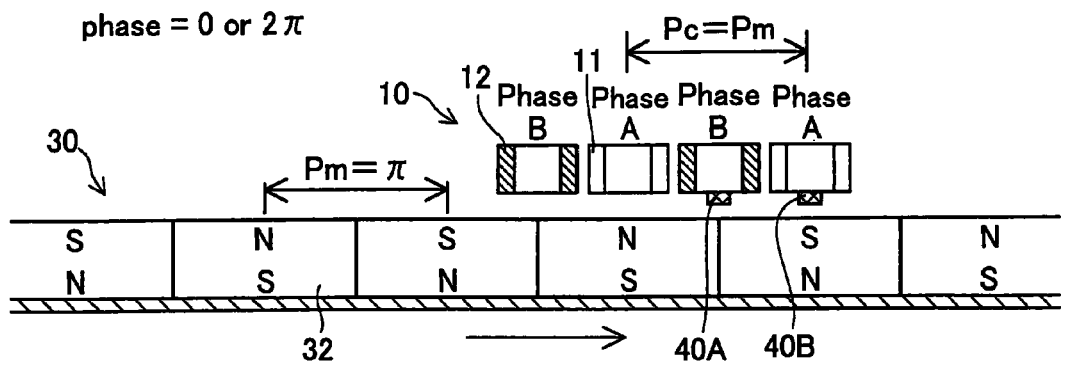
FIGS. 2A to 2D show positional relationships among the magnet array and the coil array during motor operation.

FIGS. 2A to 2D illustrate positional relationships among the magnet array and the coil arrays during motor operation. In these drawings, a large number of magnets 32 is depicted for the purpose of convenience in illustration, but the actual number of magnets is two, as shown in FIG. 1B. However, any appropriate integer may be selected for the number of magnets and the number of coils. As shown in FIG. 2A, the magnets 32 are positioned at a constant magnetic pole pitch Pm, with neighboring magnets having opposite direction of magnetization. The two coils making up the coil group of a single phase are positioned at constant pitch Pc, and are always excited in the same direction. Coils of adjacent phases are spaced apart by the equivalent of one-half the pitch Pc between coils of the same phase. The pitch Pc between coils of the same phase is equal to the magnetic pole pitch Pm. Expressed as the electrical angle, the magnetic pole pitch Pm corresponds to π. An electrical angle of 2π is associated with the mechanical angle or distance of displacement occurring when the phase of the drive signal changes by the equivalent of 2π. In the present embodiment, when the drive signal phase changes by the equivalent of 2π, the rotor portion 30 will undergo displacement by the equivalent of twice the magnetic pole pitch Pm.

Figure 2B:
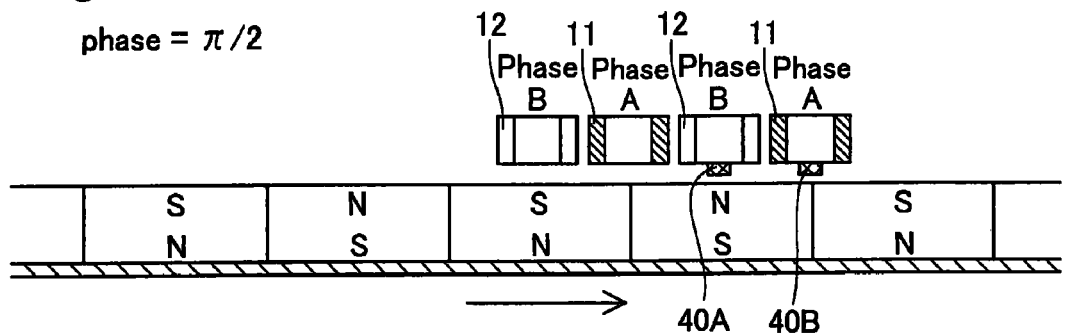
Figure 2C:
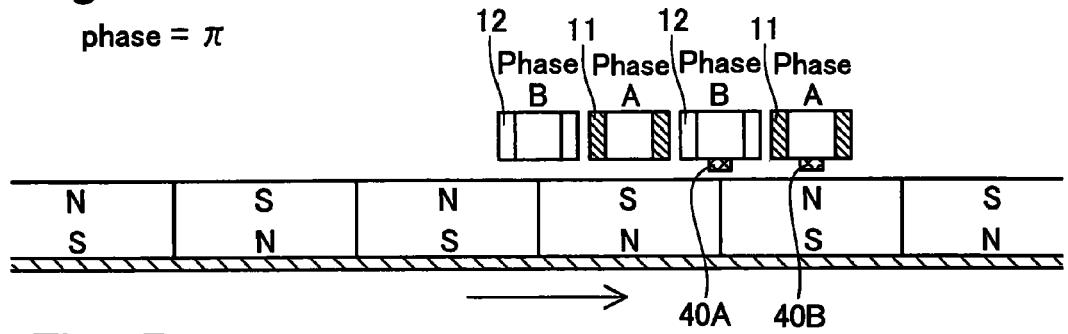
Figure 2D:
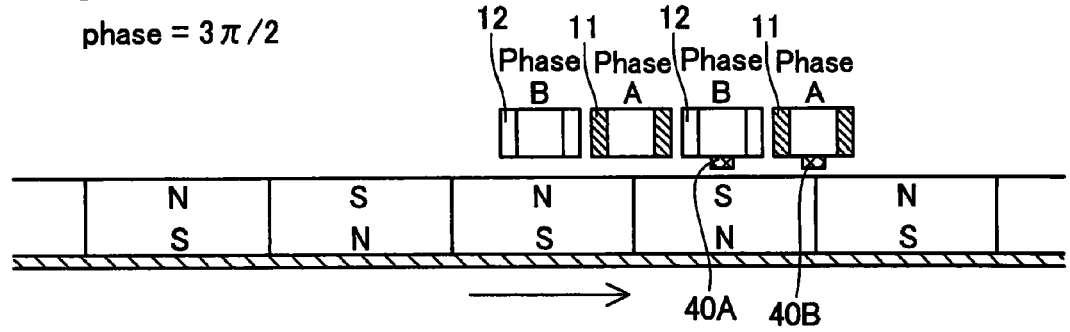

FIG. 2A depicts a state in which the phase is 0 or 2π. FIGS. 2B to 2D depict states at points in time with the phase at π/2, π, and 3π/2 respectively. In FIGS. 2A and 2C, the Phase A coils are shown without hatching; this is because the polarity of the drive signal of the Phase A coils 11 reverses (i.e. the excitation direction reverses) at this timing. Similarly, the polarity of the drive signal of the Phase B coils 12 reverses at the timing shown in FIGS. 2B and 2D.

Figure 3A:
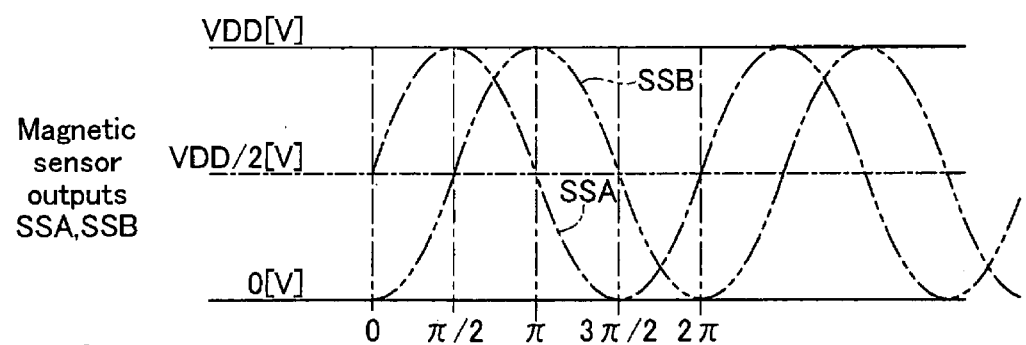
FIGS. 3A to 3C show exemplary sensor outputs and drive signals during forward operation of the motor.
Figure 3B:
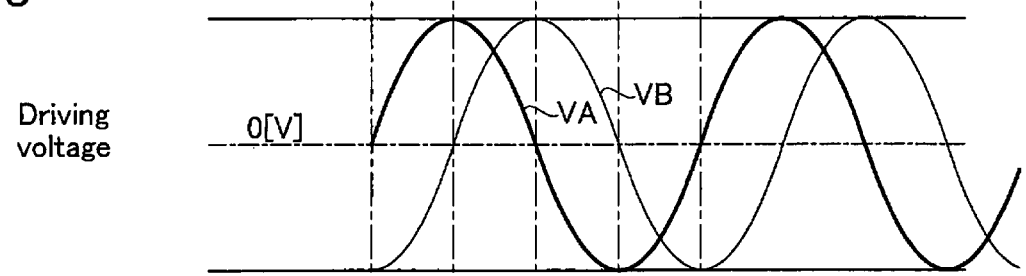
Figure 3C:
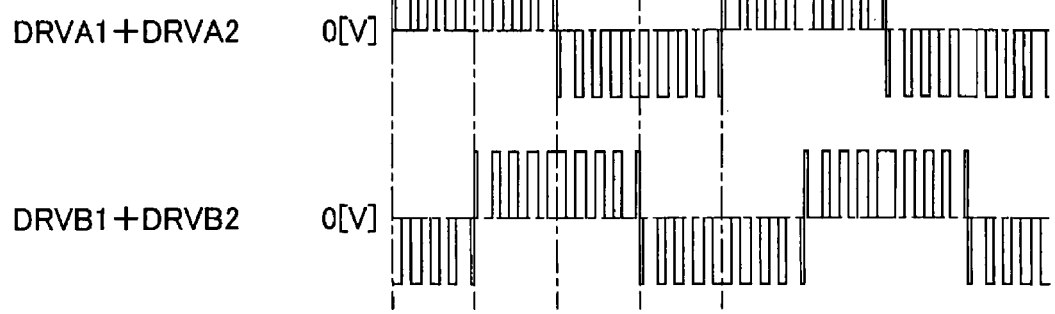

FIG. 3 is an illustration depicting exemplary sensor outputs and drive signals. FIG. 3A shows a sensor output SSA of the Phase A magnetic sensor 40A, and a sensor output SSB of the Phase B magnetic sensor 40B. Hall IC sensors having analog output may be employed as the magnetic sensors 40A, 40B. FIG. 3B shows an effective driving voltage VA which is applied to the Phase A coils 11, and an effective driving voltage VB which is applied to the Phase B coils 12. These effective driving voltages VA, VB will preferably have shape similar to the magnetic sensor outputs SSA, SSB respectively. FIG. 3C shows an example of a two phase drive signals respectively generated by PWM control using the magnetic sensor outputs SSA, SSB. The effective driving voltage VA shown in FIG. 3A represents effective voltage obtained through the phase A drive signals DRVA1, DRVA2. The Phase A first drive signal DRVA1 is a signal that pulses only when the magnetic sensor output SSA is positive, and the second signal DRVA2 is a signal that pulses only when the magnetic sensor output SSA is positive; these are shown together in FIG. 3C. For convenience in illustration, the second drive signal DRVA2 is depicted by negative pulses. This convention is employed for the B phase as well.

B. Configuration of Drive Control Circuit

Figure 4A:
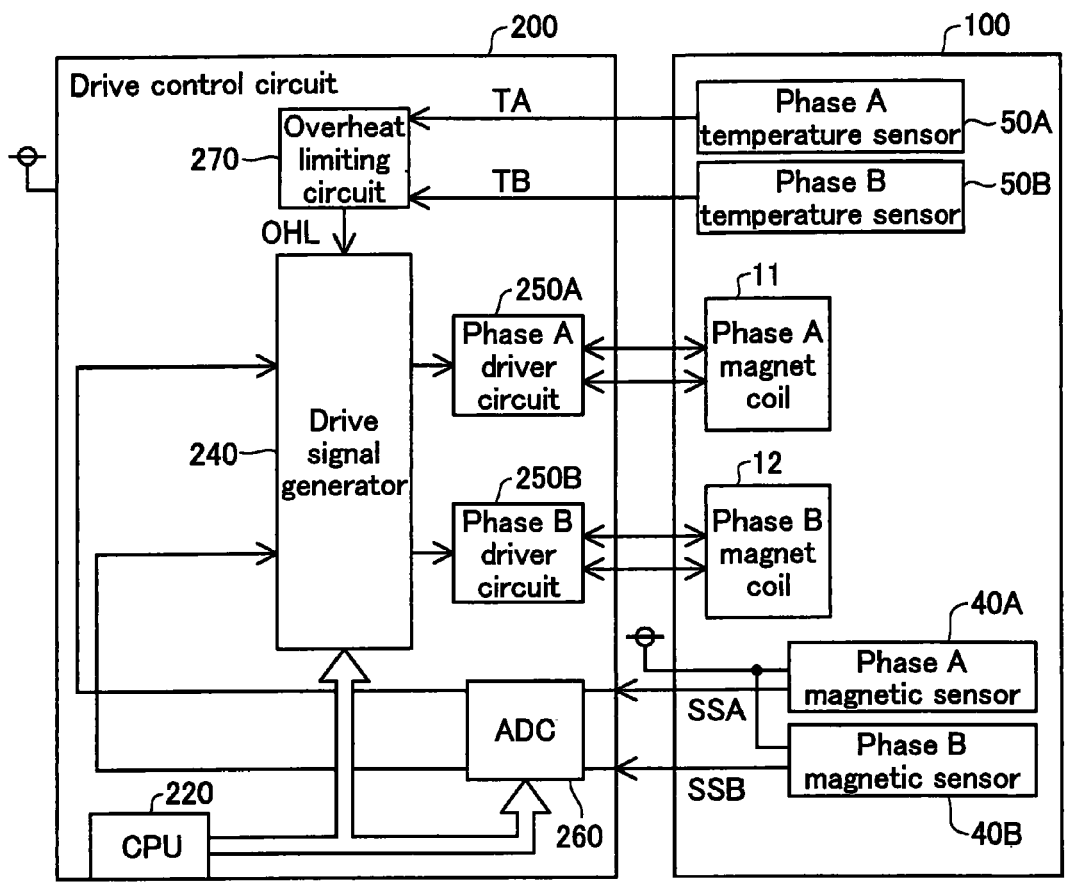
FIGS. 4A and 4B are block diagrams showing the configuration of drive control circuits of the brushless motor of Embodiment 1.

FIG. 4A is a block diagram depicting the configuration of a drive control circuit of the brushless motor of the embodiment. The drive control circuit 200 has a CPU 220, a drive signal generator 240, two phase driver circuits 250A, 250B, an AD converter 260, and an overheat limiting circuit 270. The two magnetic sensor outputs SSA, SSB are converted to digital multivalue signals by the AD converter 260, and are presented to the drive signal generator 240. The drive signal generator 240 generates two phase drive signals (FIG. 3C) on the basis of these two magnetic sensor outputs SSA, SSB. In accordance with these two phase drive signals, the driver circuits 250A, 250B drive the two phase magnet coil groups 11, 12 in the motor unit 100.

Figure 4B:
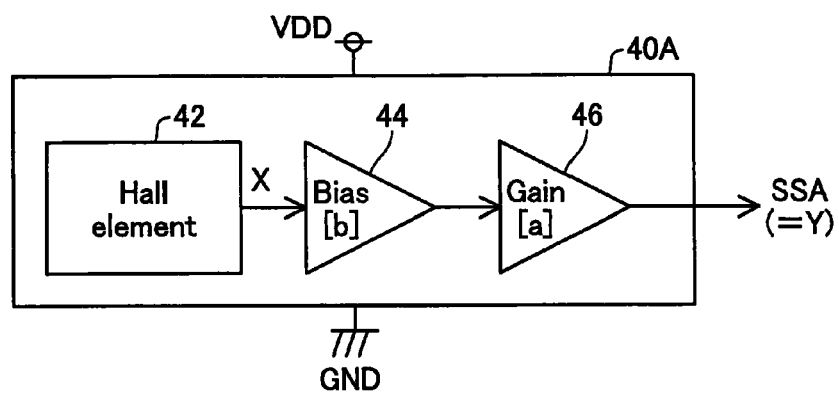

FIG. 4B depicts an exemplary internal configuration of the magnetic sensor 40A. The Phase B magnetic sensor 40B will have the same configuration. This magnetic sensor 40A has a Hall element 42, a bias adjusting portion 44, and a gain adjusting portion 46. The Hall element 42 measures magnetic flux density X. The bias adjusting portion 44 adds a bias value b to the output X of the Hall element 42; the gain adjusting portion 46 performs multiplication by a gain value a. The output SSA (=Y) of the magnetic sensor 40A is given by Expression (1) or (2) below, for example.

$$Y = a \times X + b \quad (1)$$

$$Y = a(X + b) \quad (2)$$

The gain value a and the bias value b of the magnetic sensor 40A will be set within the magnetic sensor 40A by the CPU 220. By setting the gain value a and the bias value b to appropriate values, it is possible to correct the magnetic sensor output SSA to an appropriate waveform. The arrangement is the same for the Phase B magnetic sensor 40B as well.

As shown in FIG. 4A, output signals TA, TB of the two temperature sensors 50A, 50B are presented to the overheat limiting circuit 270. The overheat limiting circuit 270 decides whether these output signals TA, TB currently exceed a prescribed threshold value, and generates an overheat limiting signal OHL. For example, the overheat limiting signal OHL may be a 1-bit signal that goes to H level when the output signals TA, TB are both equal to or less than the threshold value; and that goes to L level if either one of the output signals TA, TB goes above the threshold value. The overheat limiting signal OHL may be understood as a signal that indicates whether coil temperature of either the A phase coils 11 or the B phase coils 12 currently exceeds a prescribed threshold temperature. This overheat limiting signal OHL is presented to the drive signal generator 240. As will be discussed later, the drive signal generator 240 limits the effective application voltage of the coils 11, 12 when the overheat limiting signal OHL is L level.

Figure 14:
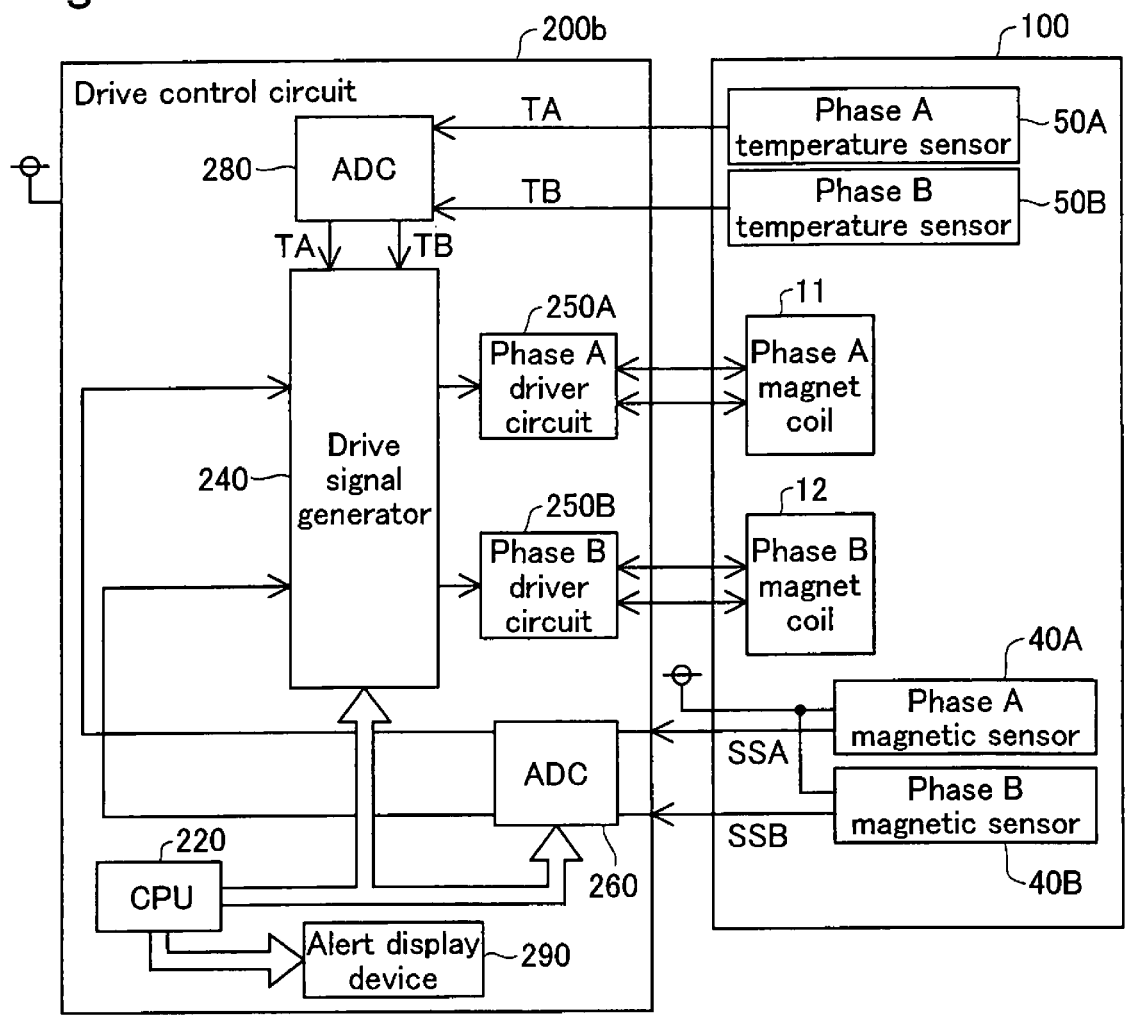
FIG. 14 is a block diagram showing the configuration of the drive control circuit of the brushless motor of the Embodiment.

The drive control circuit 200 of the present embodiment lacks a current limiting circuit of the type discussed in FIG. 14. Consequently, overheating of the coil is prevented by the action of the temperature sensors 50A, 50B and the overheat limiting circuit 270.

Figure 5:
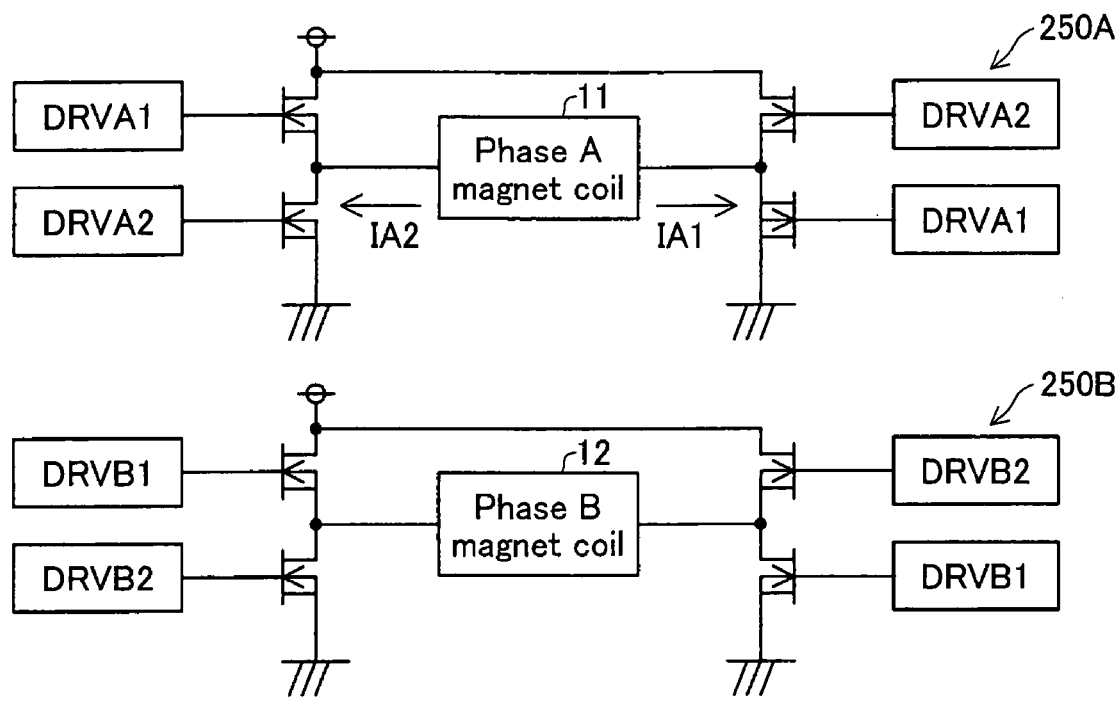
FIG. 5 is a diagram showing the internal configuration of a driver circuit.

FIG. 5 is a diagram showing the internal configuration of a driver circuit. The driver circuits 250A, 250B of each phase are respectively composed of H-bridge circuits. For example, the Phase A driver circuit 250A drives the Phase A coils 11 in response to the drive signals DRVA1, DRVA2. The arrows labeled IA1, IA2 respectively indicate the direction of current flow by the drive signals DRVA1, DRVA2. This convention applies to the other phases as well. As the driver circuits, it is possible to utilize circuits of various configuration composed of several drive transistors.

FIG. 6 is an illustration depicting the internal configuration and operation of the drive signal generator 240 (FIG. 4A). Here, for convenience in illustration only the Phase A circuit elements are shown; however, identical circuit elements are provided for Phase B use as well.

The drive signal generator 240 has a basic clock generating circuit 510, a 1/N frequency divider 520, a PWM unit 530, a forward/reverse direction value register 540, a multiplier 550, an encoder 560, a voltage control value register 580, and an excitation interval setter 590. The A phase magnetic sensor output SSA is presented to the encoder 560 and to the excitation interval setter 590. The overheat limiting signal OHL is presented to the excitation interval setter 590.

The basic clock generating circuit 510 is a circuit that generates a clock signal PCL having prescribed frequency, and is composed of a PLL circuit, for example. The frequency divider 520 generates a clock signal SDC of a frequency having a frequency equal to 1/N that of the clock signal PCL. The value of N is set to a prescribed constant. This value of N has been previously set in the frequency divider 520 by the CPU 220. PWM unit 530 generates the Phase A drive signals DRVA1, DRVA2 (FIG. 3C) in response to the clock signals PCL, SDC, a multiplication value Ma supplied by the multiplier 550, a forward/reverse direction instruction value RI supplied by the forward/reverse direction value register 540, a positive/negative sign signal Pa supplied by the encoder 560, and an excitation interval signal Ea supplied by the excitation interval setter 590. This operation will be discussed later.

The value RI indicating the direction of rotation of the motor is set within the forward/reverse direction value register 540 by the CPU 220. In the present embodiment, the motor rotates in forward when the forward/reverse direction instruction value RI is L level, and rotates in reverse when the value is H level. The other signals Ma, Pa, and Ea presented to the PWM unit 530 are determined in the following manner.

The output SSA of the magnetic sensor 40A is presented to the encoder 560. The encoder 560 converts the range of the magnetic sensor output SSA, while setting the value of the middle point of sensor output to 0. As a result, the sensor output value Xa generated by the encoder 560 assumes values in a prescribed positive range (e.g. between +127 and 0) and in a prescribed negative range (e.g. between 0 and −127). However, the sensor output value Xa presented to the multiplier 550 by the encoder 560 is an absolute value; the positive or negative sign thereof, in the form of the positive/negative sign signal Pa, is provided to the PWM unit 530.

The voltage control value register 580 stores a voltage control value Ya set by the CPU 220. This voltage control value Ya, together with the excitation interval signal Ea discussed later, functions as a value for setting the application voltage of the motor; it may assume a value of 0 to 1.0, for example. Assuming an instance where the excitation interval signal Ea has been set in such a way that all intervals are excitation intervals, with no non-excitation intervals being provided, when Ya=0 this will mean that the application voltage is zero, and when Ya=1.0 this will mean that application voltage is at its maximum value. The multiplier 550 performs multiplication and integer conversion of the voltage control value Ya and the sensor output value Xa output from the encoder 560; the multiplication value Ma thereof is presented to the PWM unit 530.

FIGS. 6B to 6E depict operation of the PWM unit 530 in instances where the multiplication value Ma has assumed various values. Here, it is assumed that all intervals are excitation intervals and that there are no non-excitation intervals. The PWM unit 530 is a circuit that, during a single cycle of the clock signal SDC, generates one pulse at a duty factor of Ma/N. Specifically, as shown in FIGS. 6B to 6E, in association with an increasing multiplication value Ma, the pulse duty factor of the Phase A drive signals DRVA1, DRVA2 increases as well. The first drive signal DRVA1 is a signal that pulses only when the magnetic sensor output SSA is positive, and the second drive signal DRVA2 is a signal that pulses only when the magnetic sensor output SSA is positive; in FIGS. 6B to 6E, these are shown together. For convenience, the second drive signal DRVA2 is shown as negative pulses.

FIGS. 7A through 7C depict correspondence relationships between sensor output waveforms and waveforms of drive signals generated by the PWM unit 530. In the drawings, "Hiz" denotes a high impedance state with the magnet coils in the unexcited state. As explained with reference to FIGS. 6A-6E, the Phase A drive signals DRVA1, DRVA2 are generated by PWM control using the analog waveform of the Phase A sensor output. Consequently, using these Phase A drive signals DRVA1, DRVA2 it is possible to present the coils with effective voltage exhibiting change in level corresponding to change in the sensor output SSA.

The PWM unit 530 is furthermore designed so as to output a drive signal only during excitation intervals indicated by the excitation interval signal Ea supplied by the excitation interval setter 590, while not outputting a drive signal during intervals other than the excitation intervals (non-excitation intervals). FIG. 7C depicts drive signal waveforms produced in the case where excitation intervals EP and non-excitation intervals NEP have been established by the excitation interval signal Ea. During excitation intervals EP, the drive signal pulses of FIG. 7B are generated as is; drive signal pulses are not generated during non-excitation intervals NEP. By establishing excitation intervals EP and non-excitation intervals NEP in this way, voltage will not be applied to coils at a point in proximity to the middle point of sensor output (this corresponds to proximity to the middle point of the back electromotive force waveform), thus making possible further improvement of motor efficiency. In preferred practice excitation intervals EP will be established at intervals symmetric about the peak of the sensor output waveform (this is substantially equivalent to the back electromotive force waveform), and the non-excitation intervals NEP will be established at intervals symmetric about the middle point (center point) of the sensor output waveform.

As discussed previously, if the voltage control value Ya is set to a value less than 1, the multiplication value Ma will be small in proportion to the voltage control value Ya. Consequently, effective adjustment of application voltage through the voltage control value Ya is possible as well.

As will be understood from the preceding discussion, with the motor of the present embodiment, it is possible to adjust the application voltage using both the voltage control value Ya and the excitation interval signal Ea. In preferred practice, relationships between the preferred application voltage on the one hand, and the voltage control value Ya and the excitation interval signal Ea on the other, will be stored in advance in table format in memory in the drive control circuit 200 (FIG. 4A). By so doing, when the drive control circuit 200 has received from outside a preferred application voltage target value, it will be possible for the CPU 220, in response to the target value, to set the voltage control value Ya and the excitation interval signal Ea in the drive signal generator 240. Adjustment of application voltage does not require the use of both the voltage control value Ya and the excitation interval signal Ea, and it would be acceptable to use either of these instead.

Figures 6A, 6B, 6C, 6D, 6E:
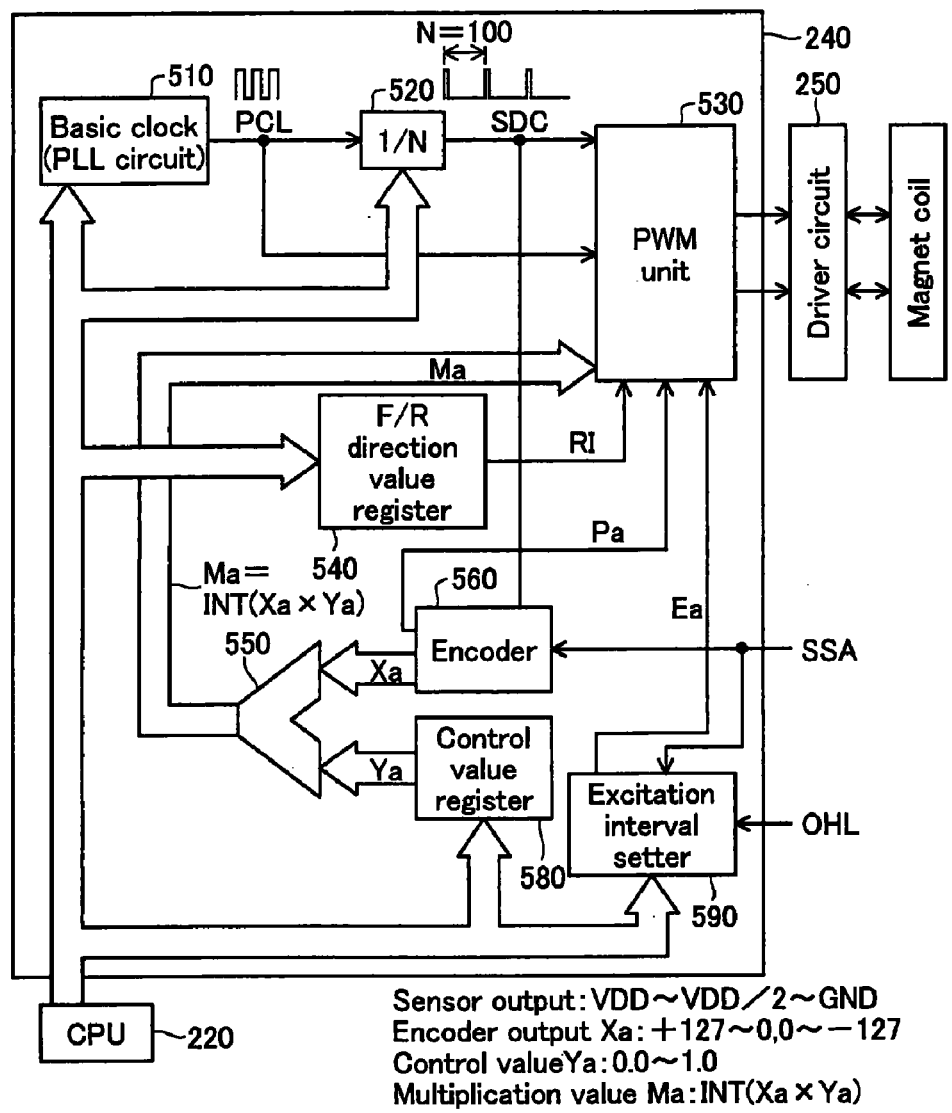
FIGS. 6A to 6E show the internal configuration and operation of a drive signal generator.
Figure 8:
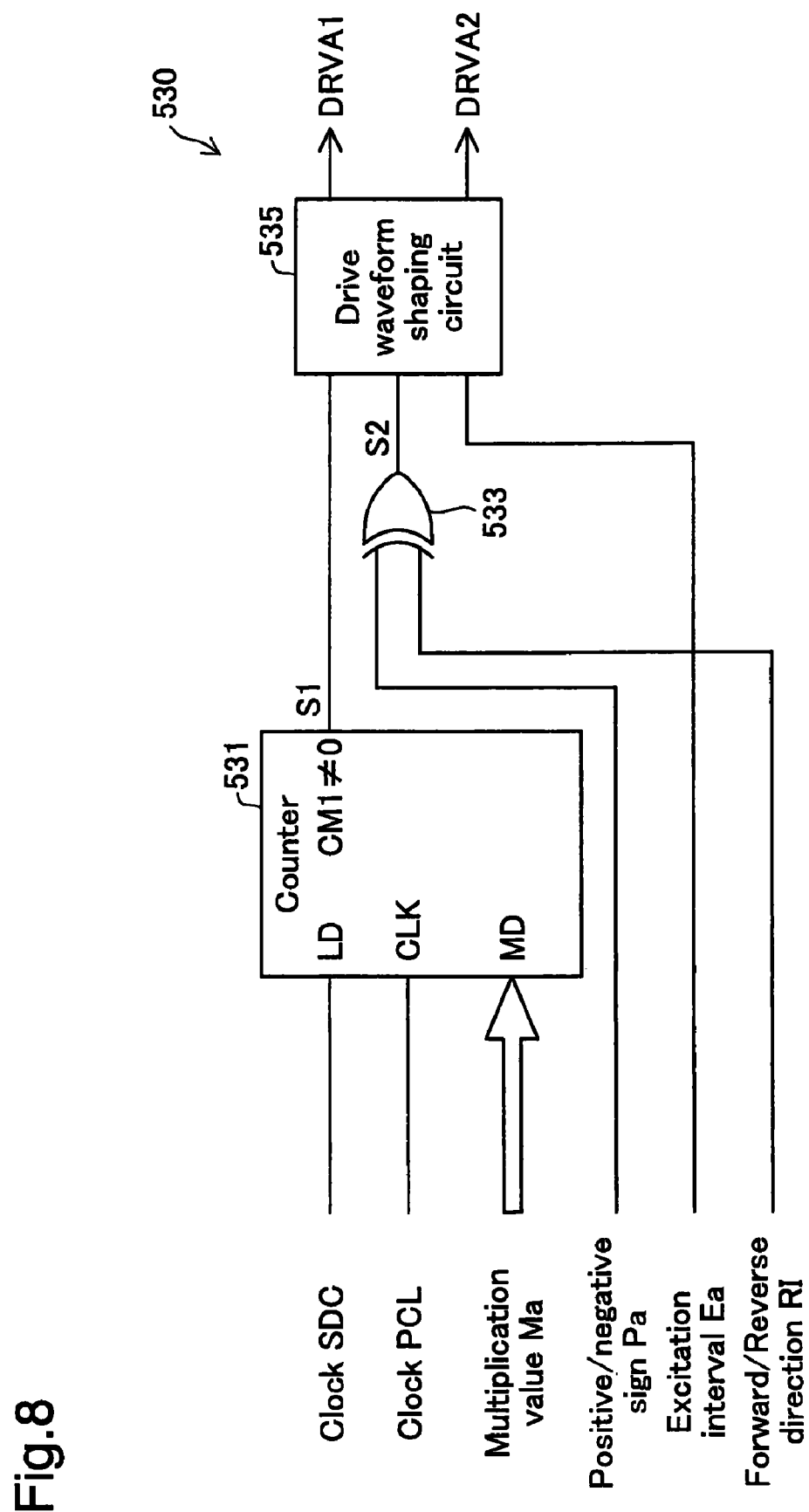
FIG. 8 is a block diagram depicting the internal configuration of a PWM unit.

FIG. 8 is a block diagram depicting the internal configuration of the PWM unit 530 (FIG. 6A). The PWM unit 530 has a counter 531, an EXOR circuit 533, and a drive waveform shaping circuit 535. Their operation will be described below.

Figure 9:
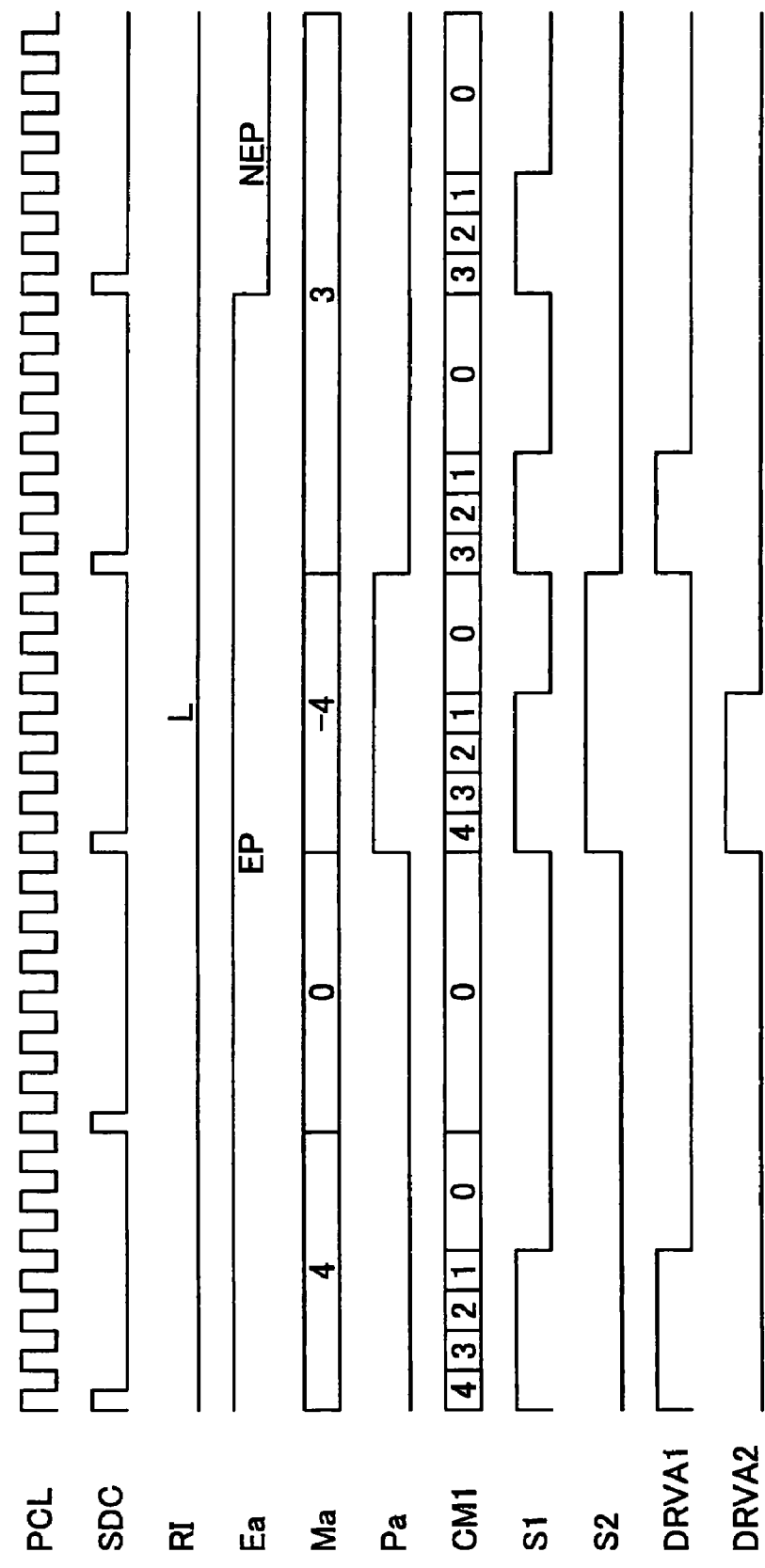
FIG. 9 is a timing chart depicting operation of the PWM unit during forward rotation of the motor.

FIG. 9 is a timing chart depicting operation of the PWM unit 530 during forward rotation of the motor. In the drawing, the two clock signals PCL and SDC, the forward/reverse direction value RI, the excitation interval signal Ea, the multiplication value Ma, the positive/negative sign signal Pa, the counter value CM1 in the counter 531, the output SI of the counter 531, the output S2 of the EXOR circuit 533, and the output signals DRVA1, DRVA2 of the drive waveform shaping circuit 535 are shown. In each one cycle of the clock signal SDC, the counter 531 repeats an operation to decrement the count value CM1 down to 0, in sync with the clock signal PCL. The initial value of the count value CM1 is set to the multiplication value Ma. In FIG. 9, for convenience in illustration, negative multiplication values Ma are shown as well; however, the absolute value |Ma| thereof will be used in the counter 531. The output S1 of the counter 531 is set to H level when the count value CM1 is not 0, and drops down to L level when the count value CM1 goes to 0.

The EXOR circuit 533 outputs a signal S2 representing exclusive OR of the positive/negative sign signal Pa and the forward/reverse direction value RI. When the motor is running forward, the forward/reverse direction value RI is L level. Consequently, the output S2 of the EXOR circuit 533 will be a signal identical to the positive/negative sign signal Pa. The drive waveform shaping circuit 535 generates the drive signals DRVA1, DRVA2 from the output S1 of the counter 531 and the output S2 of the EXOR circuit 533. Specifically, in the output S1 of the counter 531, the signal of intervals at which the output S2 of the EXOR circuit 533 is L level is output as the drive signal DRVA1, and the signal of intervals at which the output S2 of the EXOR circuit 533 is H level is output as the drive signal DRVA2. The excitation interval signal Ea falls to L level in proximity to the right edge in FIG. 9, thereby setting up a non-excitation interval NEP. Consequently, neither of the drive signals DRVA1, DRVA2 will be output during this non-excitation interval NEP, and a state of high impedance will be maintained.

FIG. 10 is a timing chart depicting operation of the PWM unit 530 during reverse rotation of the motor. When the motor is running in reverse, the forward/reverse direction value RI is H level. As a result, the two drive signals DRVA1, DRVA2 switch position with those in FIG. 9, and it will be appreciated that the motor runs in reverse as a result.

Figure 11A:
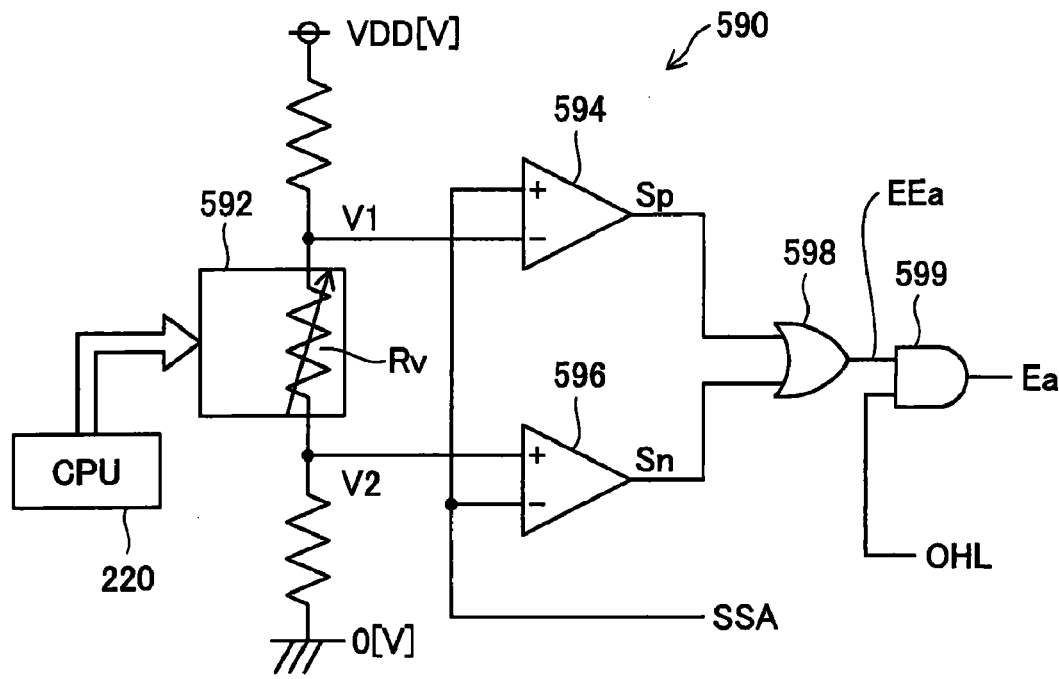
FIGS. 11A and 11B show the internal configuration and operation of an excitation interval setter.
Figure 11B:
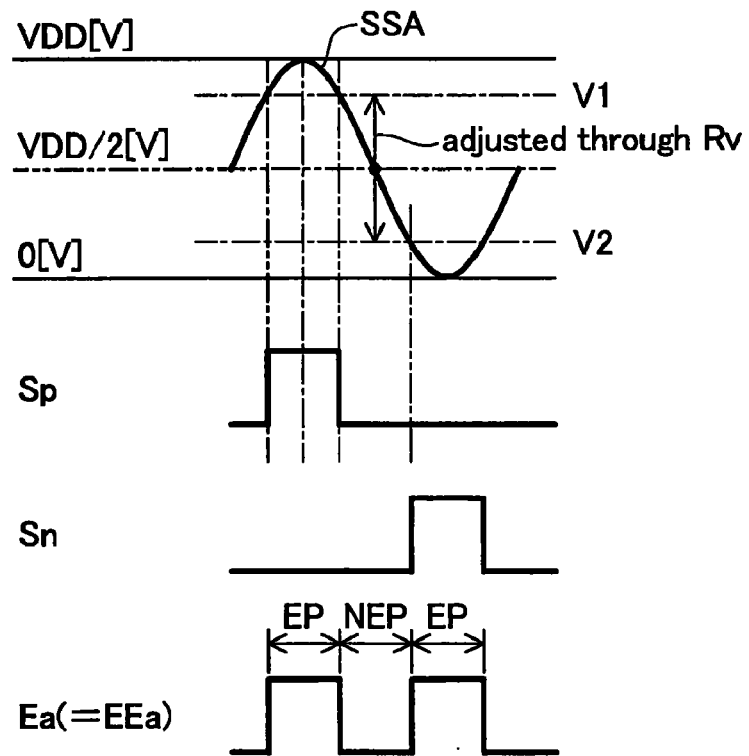

FIGS. 11A and 11B illustrate the internal configuration and operation of the excitation interval setter 590. The excitation interval setter 590 has an electronic variable resistor 592, voltage comparators 594, 596, an OR circuit 598, and an AND circuit 599. The resistance Rv of the electronic variable resistor 592 is set by the CPU 220. The voltages V1, V2 at the two terminals of the electronic variable resistor 592 are presented to one input terminal of each of the voltage comparators 594, 596. The magnetic sensor output SSA is presented to the other input terminal of each of the voltage comparators 594, 596. The output signals Sp, Sn of the voltage comparators 594, 596 are input to the OR circuit 598. The output EEa of the OR circuit 598, together with the overheat limiting signal OHL, is input to the AND circuit 599. The output of the AND circuit 599 is the excitation interval signal Ea, which is used for distinguishing excitation intervals from non-excitation intervals.

FIG. 11B depicts operation of the excitation interval setter 590 in the event that the overheat limiting signal OHL is H level. The two terminal voltages V1, V2 of the electronic variable resistor 592 are modified by adjusting the resistance Rv. Specifically, the two terminal voltages V1, V2 are set to values having equal difference from the median value of the voltage range (=VDD/2). In the event that the magnetic sensor output SSA is higher than the first voltage V1, the output Sp of the first voltage comparator 594 will go to H level, whereas in the event that the magnetic sensor output SSA is lower than the second voltage V2, the output Sn of the second voltage comparator 596 will go to H level. The excitation interval signal Ea (=EEa) is a signal that assumes the logical sum of these output signals Sp, Sn. Consequently, as shown at bottom in FIG. 11B, the excitation interval signal Ea may be used as a signal for indicating the excitation intervals EP and the non-excitation intervals NEP. The excitation intervals EP and the non-excitation intervals NEP are established through adjustment of the variable resistance Rv by the CPU 220.

As mentioned previously, in the event that the temperature of either the Phase A coils 11 or the Phase B coils exceeds prescribed threshold temperature, the overheat limiting signal OHL will go to L level. In this event, the excitation interval signal Ea is always at L level regardless of the level of the output EEa of the OR circuit 598. As a result, voltage will not be applied to the coils 11, 12, thus preventing the coils 11, 12 from overheating. As will be understood from this description, the circuit configuration of the excitation interval setter 590 may be divided into two circuit sections, namely, a first interval setting section (composed of the elements 592, 594, 596, and 598) that regardless of the overheat limiting signal OHL generates the first excitation interval signal EEa (also termed a "preliminary excitation interval signal") shown in FIG. 11B; and a logical operation circuit 599 that takes the logical AND of this first excitation interval signal EEa and the overheat limiting signal OHL. The first excitation interval signal EEa is established by the resistance Rv; and the resistance Rv is established on the basis of an externally provided command value (target value) for operating voltage of the brushless motor. Consequently, the first excitation interval signal EEa may be understood to be established on the basis of an externally provided command value for the operating voltage of the brushless motor.

In the brushless motor of the preceding embodiment, the coils 11, 12 are prevented from overheating through the workings of the temperature sensors 50A, 50B and the overheat limiting circuit 270 as described above. Thus, there is no need to provide a current limiting circuit like that used conventionally. Moreover, since undue limiting of current at startup will be prevented, it will also be possible to avoid the problem of an inability to generate sufficient torque at startup. Specifically, where power is supplied by rectangular wave driving in regions of change of the S and N magnetic poles as is the conventional practice, short-circuit current will be produced and a current limiting circuit will be required. In the present embodiment, however, as shown in FIGS. 7A to 7C, in these regions of change, supply of power by sine wave driving is inhibited and short-circuit current is not produced, so there is no need for a current limiting circuit. Moreover, at startup, since the startup current for producing startup torque and the impedance of the magnetic coils are determined by the design, there is no need to design overcurrent protection. Furthermore, in the event that overcurrent not anticipated in the design should occur, overcurrent persisting for longer than the planned time will be suppressed through temperature detection.

Figure 12:
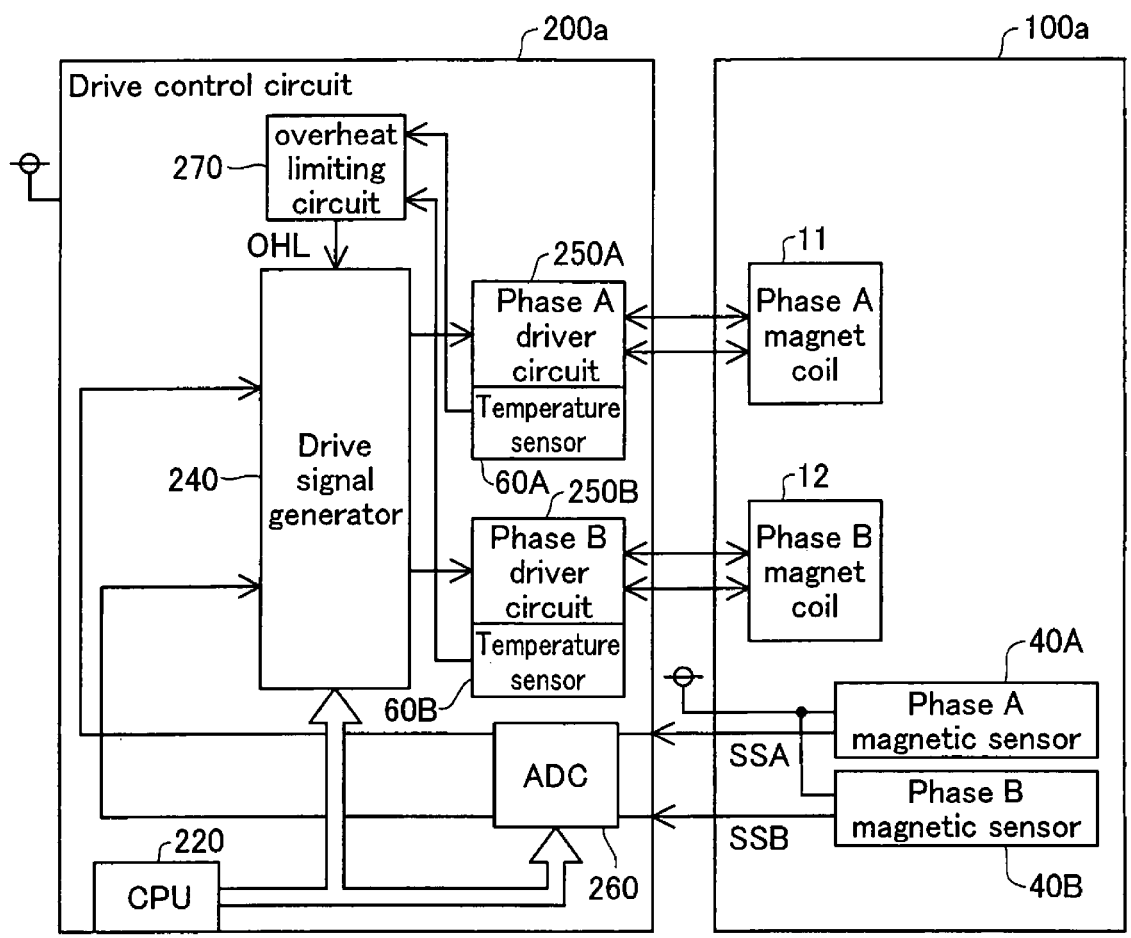
FIG. 12 is a block diagram showing another configuration of the drive control circuit of the brushless motor.

FIG. 12 is a block diagram showing another exemplary configuration of the drive control circuit of the brushless motor. In this drive control circuit 200a, the driver circuits 250A, 250B of the drive control circuit 200 shown in FIG. 4A are respectively furnished with temperature sensors 60A, 60B. The temperature sensors 50A, 50B in the motor unit 100 shown in FIG. 4A have been omitted from the motor unit 100a. The configuration is otherwise the same as that of the circuit shown in FIG. 4A. The temperature sensors 60A, 60B are for the purpose of detecting temperature of the driving elements (driving transistors) that make up the driver circuits 250A, 250B.

Figure 13A:
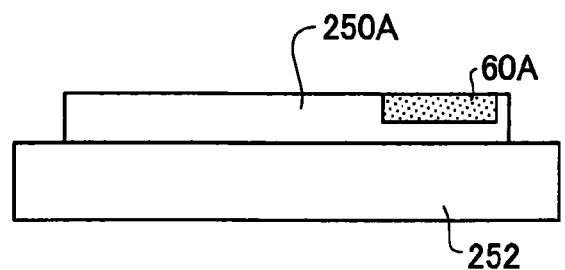
FIGS. 13A and 13B show other examples of mounting of temperature sensors.

FIG. 13A shows an example of mounting of the temperature sensor 60A. In this example, a power semiconductor element constituting the driver circuit 250A is installed on a radiator substrate 252, with the temperature sensor 60A mounted inside the power semiconductor element. The temperature sensor 60B is similarly mounted in the other driver circuit 250B (not shown in the drawing). As the temperature sensors 60A, 60B it is possible to use diode elements, for example. Since the current-voltage characteristics of diode elements are temperature-dependent, it will be possible to detect temperature by measuring the current-voltage characteristics of the diode element. In this case, it will be preferable to provide within the overheat limiting circuit 270 (FIG. 12) a temperature determining circuit for determining temperature from the current-voltage characteristics of the diode element. The overheat limiting circuit 270 will decide whether temperature determined on the basis of the output of the temperature sensors 60A, 60b exceeds a prescribed threshold value, and generate an overheat limiting signal OHL. This function is identical to that discussed previously in FIG. 4A. The temperature determining circuit in the overheat limiting circuit 270 will preferably have a temperature compensating function for the purpose of compensating for its own temperature characteristics.

Figure 13B:
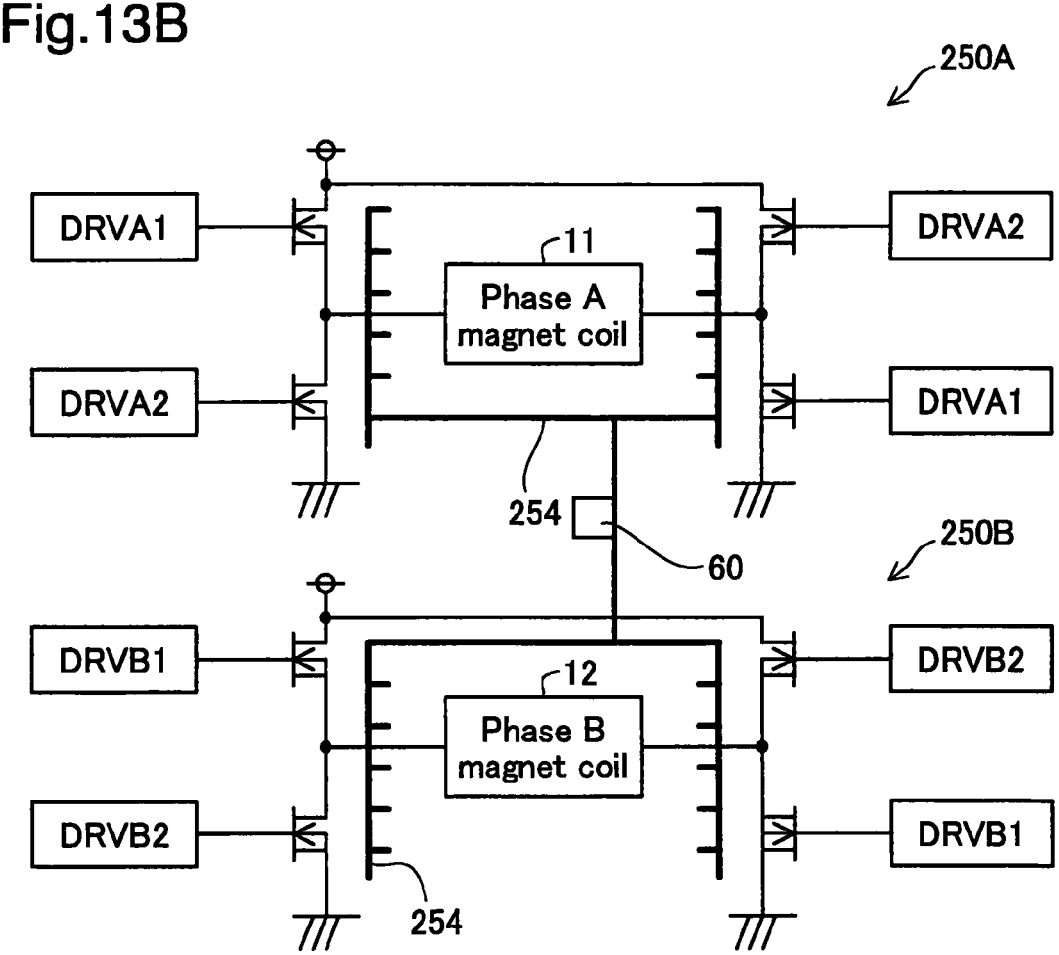

FIG. 13B shows another example of mounting of a temperature sensor. In this example, the driver circuits 250A, 250B are furnished with a radiator plate 254, with a temperature sensor 60 provided on the radiator plate 254. In this example, only one temperature sensor 60 is provided, but it is acceptable to instead provide one temperature sensor in proximity to each of the driver circuits 250A, 250B. The temperature sensor 60 does not measure the temperature of the driving elements of the driver circuits 250A, 250B per se, but rather measures the temperature of the radiator plate 254, which varies in association with the temperature of the driving elements. As will be understood from this example, it is not necessary to measure temperature of the driving elements per se: overheat limitation may instead be carried out by detecting a detection target temperature that is associated with the temperature of the driving elements (e.g. a temperature that rises and falls in association with the temperature of the driving elements). This applies similarly to coil temperature discussed previously.

C. Other Embodiments

FIG. 14 is a block diagram showing the configuration of a drive control circuit of a brushless motor pertaining to another embodiment. In this drive control circuit 200b, the overheat limiting circuit 270 shown in FIG. 4A is replaced with an AD converter 280; and there is provided an additional alert display device 290. The output signals TA, TB (called "temperature signals") of the temperature sensors 50A, 50B are converted to digital multivalue signals by the AD converter 280 and presented to the drive signal generator 240. The drive signal generator 240 then generates two phase drive signals (FIG. 3C) on the basis of the magnetic sensor outputs SSA, SSB and the temperature signals TA, TB.

Figure 23:
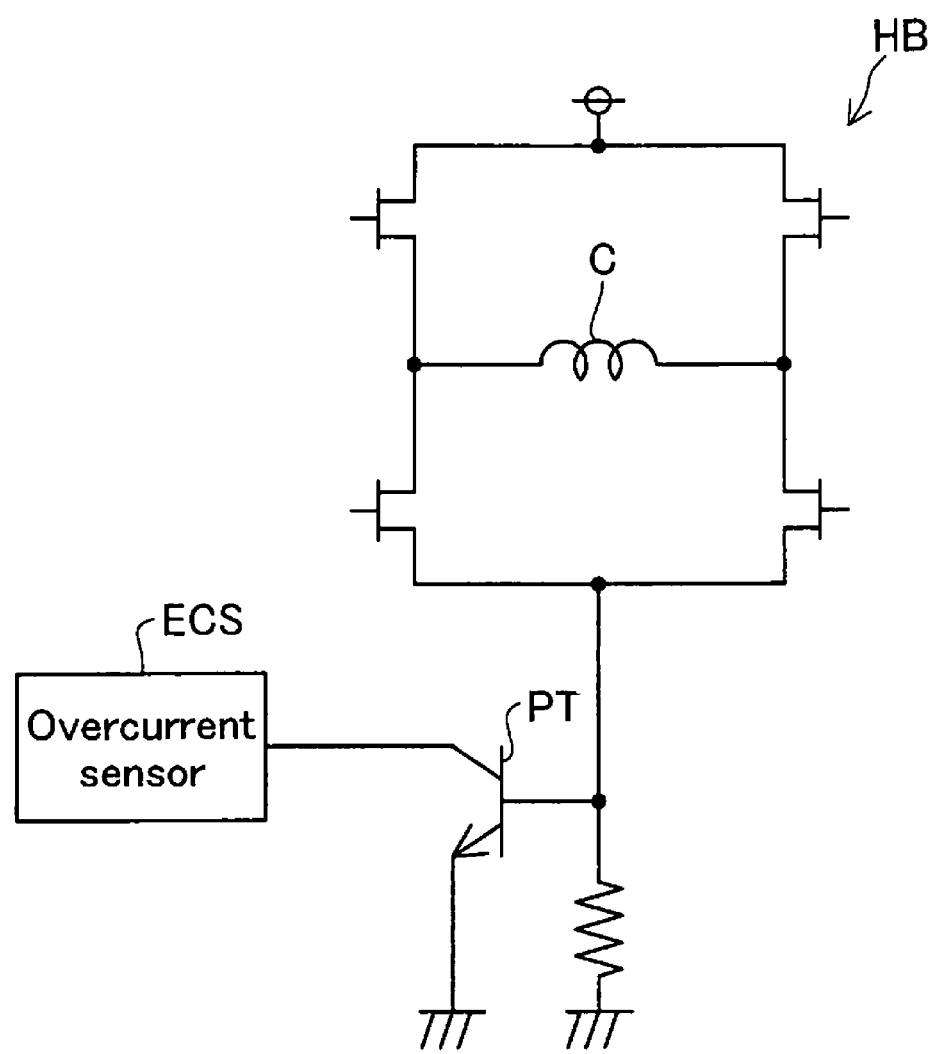
FIG. 23 illustrates an example of an overcurrent limiting circuit used in a conventional brushless motor.

The drive control circuit 200b of the present embodiment is not furnished with a current limiting circuit as described in FIG. 23. Consequently, overheating of the coils is prevented through the workings of the temperature sensors 50A, 50B and the drive signal generator 240.

Figure 15:
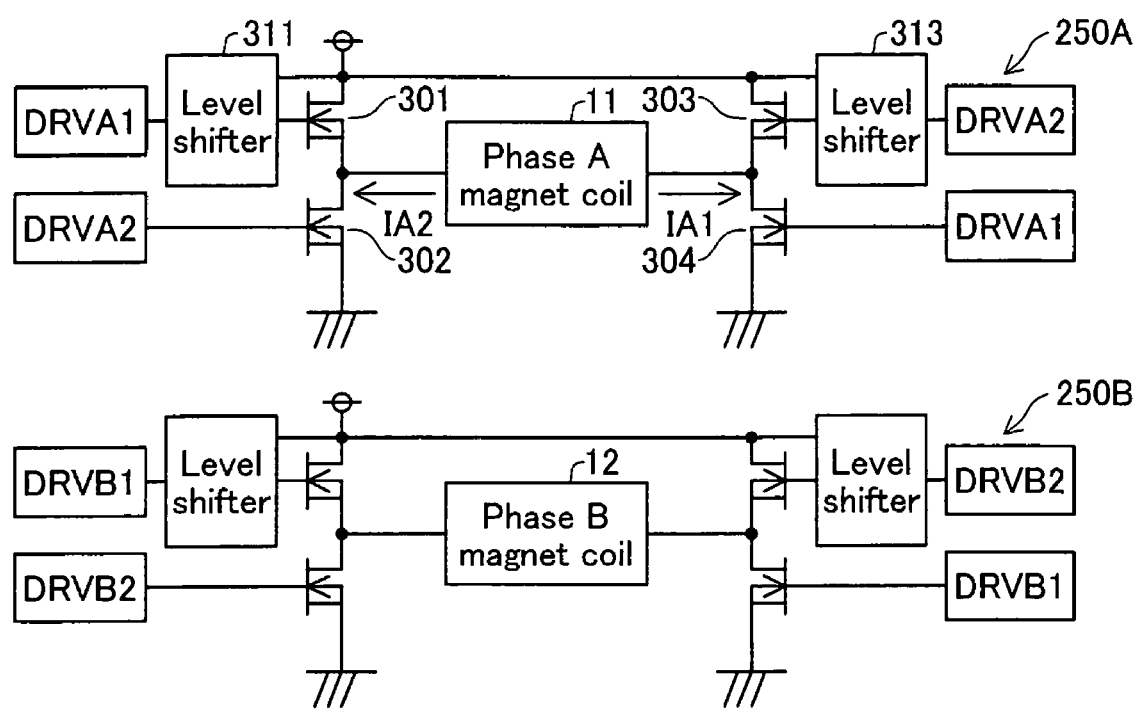
FIG. 15 is a diagram showing the internal configuration of driver circuits.

FIG. 15 is a diagram showing another configuration of driver circuits. Each of the driver circuits 250A, 250B of the phases has four transistors 301 to 304 constituting an H-bridge circuit. Level shifters 311, 313 are provided to the front of the gate electrodes of the transistors 301, 303 of the upper arm. However, the level shifters may be dispensed with.

FIGS. 16A to 16E show the internal configuration and operation of the drive signal generator 240 shown in FIG. 14A. For convenience in illustration, only the circuit elements for Phase A are shown, but identical circuit elements are provided for Phase B as well.

This drive signal generator 240 is of similar configuration to the circuit shown in FIG. 6A but has an additional temperature monitoring section 570. The temperature signals TA, TB are presented to the temperature monitoring section 570. The operation of this drive signal generator 240 is substantially identical to that of the circuit shown in FIG. 6A, but differs somewhat in the following respect.

The voltage control value register 580 stores a voltage control value Ya that has been set by the CPU 220. This voltage control value Ya, together with a temperature monitoring signal Za (also called "temperature gain Za") generated by the temperature monitoring section 570, functions as a value for setting the application voltage of the motor.

Figure 17:
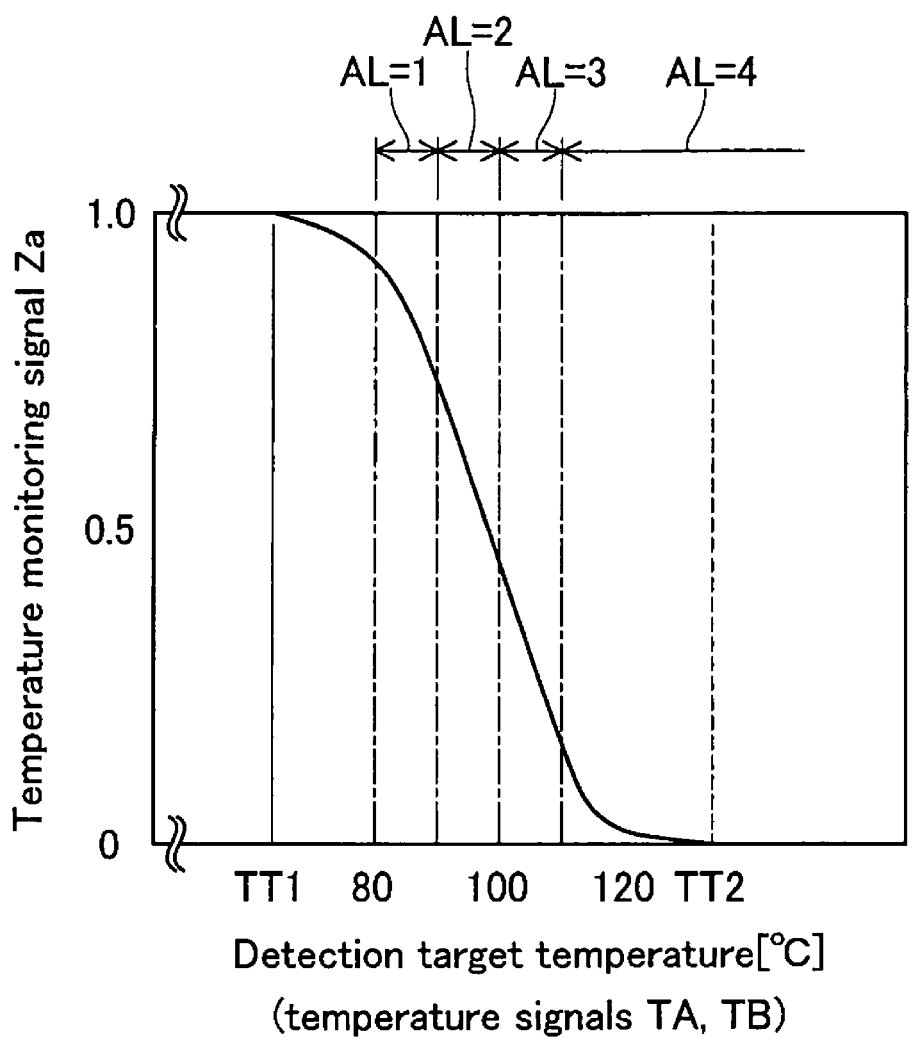
FIG. 17 is graph showing the relationship between a temperature monitoring signal Za and temperature signals.

FIG. 17 is graph showing the relationship between the temperature monitoring signal Za generated by the temperature monitoring section 570, and the temperature signals. The horizontal axis shows the temperature represented by the temperature signal TA or TB (also called the detection target temperature"); the vertical axis shows the level of the temperature monitoring signal Za. The temperature monitoring signal Za is maintained at 1.0 (its maximum value) throughout a low temperature range up to the point that the detection target temperature reaches a prescribed first threshold value TT1. When the detection target temperature goes above the first threshold value TT1, the level of the temperature monitoring signal Za will decrease monotonically so that the temperature monitoring signal Za is smaller in association with higher detection target temperature. When the detection target temperature goes above a prescribed second threshold value TT2, the temperature monitoring signal Za goes to zero. In the present embodiment, the two temperature signals TA, TB are input to the temperature monitoring section 570, but it is possible to instead use either of the temperatures (i.e. that with the higher or the lower value) indicated by the two temperature signals TA, TB as the detection target temperature. The temperature monitoring signal Za generated in this manner is presented to the multiplier 550 by the temperature monitoring section 570.

The multiplier 550 performs multiplication and integer conversion of three terms, namely the sensor output value Xa output from the encoder 560, the voltage control value Ya, and the temperature monitoring signal Za; and presents the multiplication value Ma thereof to the PWM unit 530.

FIGS. 17B to 17E depict operation of the PWM unit 530 where the multiplication value Ma assumes various values. As noted previously, the multiplication value Ma is the result of multiplying the three values Xa, Ya, and Za. Consequently, the multiplication value Ma is a digital signal that exhibits the same change as analog change of the magnetic sensor output signal SSA (FIG. 3A), and that has amplitude proportional to the signal levels of both the voltage control value Ya and the temperature monitoring signal Za. Since the magnetic sensor output signal SSA is normally a signal that approximates a sine wave, the digital signal represented by the multiplication value Ma will also be a signal having a waveform that approximates a sine wave. Thus, in the present embodiment, the digital signal represented by the multiplication value Ma is also referred to as a "waveform signal." Alternatively, the control value register 580 may be eliminated and the voltage control value Ya not used. In this case, the multiplication value Ma will exhibit the same change as analog change of the magnetic sensor output signal SSA, and have amplitude proportional to the temperature monitoring signal Za.

Through PWM control, the PWM unit 530 (FIG. 6A) generates a drive signal that exhibits change in effective voltage substantially identical to change in this multiplication value Ma (i.e. change in the waveform signal). Consequently, the effective voltage of the drive signal will be proportional to the temperature monitoring signal Za. As a result, if the detection target temperature goes above the first threshold value TT1 (FIG. 17), the effective voltage of the coil drive signal will decline in association with higher detection target temperature, preventing overheating of the motor. Moreover, since the level of the temperature monitoring signal Za will also decline gradually in association with a rise in the detection target temperature, undue limitation of current will be prevented. For example, in the event that a high load is placed on the motor while the motor is rotating and as a result the detection target temperature has risen, the driving voltage will decline gradually in accordance with the characteristics shown in FIG. 17, making it possible to prevent overheating.

In the example of FIG. 17, four alert temperature ranges having different alert levels AL have been established within the temperature range of detection target temperature above the first threshold value TTI. In the event that the detection target temperature has reached an alert temperature range, the alert display device 290 (FIG. 16A) may display an alert depending on the alert level AL. For the alert display, it is possible to utilize, for example, numerals indicating the alert level AL; or various displays that indicate alert levels AL by different colors. By performing alert display in this manner, it is possible for the user of the motor to immediately ascertain that the motor is reaching an overheated condition.

The operation and circuit configurations described in FIGS. 7A through 11B are the same in this embodiment as well. However, in the present embodiment, the waveforms of FIGS. 7A through 7C correspond to waveforms where Ya=1 and Za=1.

As will be understood from the preceding discussion, with the brushless motor of the present embodiment, it is possible to adjust the application voltage using both the voltage control value Ya and the excitation interval signal Ea, even where the value of the temperature monitoring signal Za is maintained at 1.0. In preferred practice, relationships between desired application voltage on the one hand, and the voltage control value Ya and the excitation interval signal Ea on the other, will have been previously stored in table form in the memory of the drive control circuit 200b (FIG. 14). Thus, when the drive control circuit 200b has received an externally provided target value for desired application voltage, it will be possible for the CPU 220, in response to this target value, to then set the voltage control value Ya and the excitation interval signal Ea in the drive signal generator 240. Adjustment of application voltage need not utilize both the voltage control value Ya and the excitation interval signal Ea, and it is acceptable to use either one of them instead.

Figure 18:
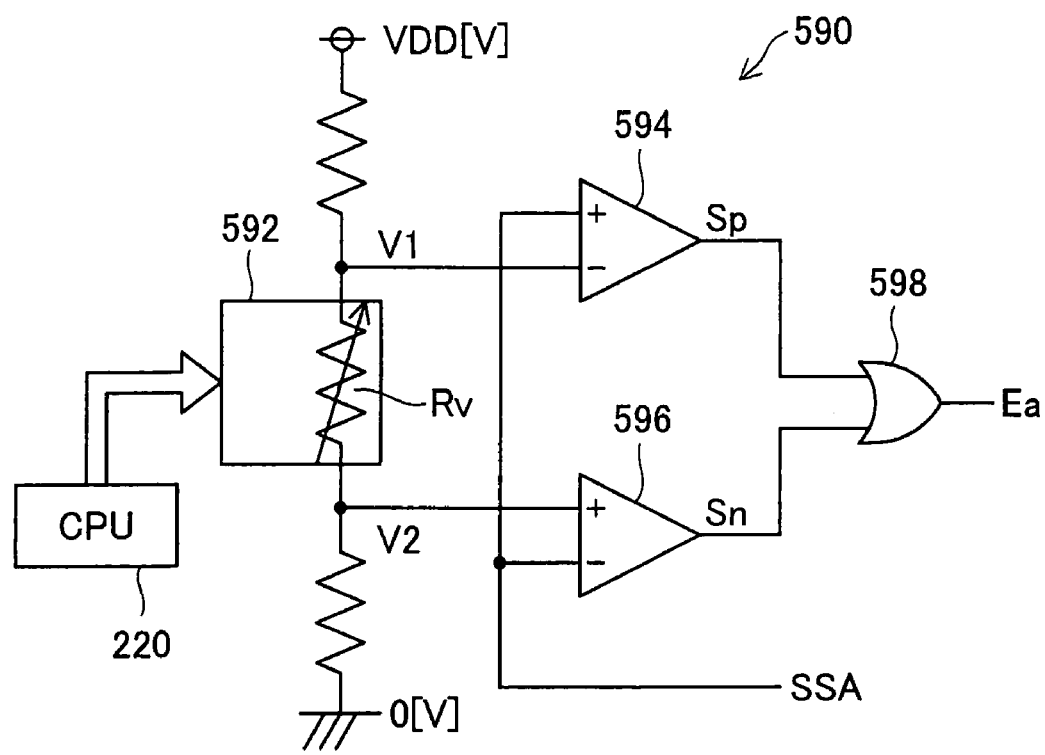
FIG. 18 is an illustration showing the internal configuration of an excitation interval setter.

FIG. 18 is an illustration showing the internal configuration and operation of the excitation interval setter 590. This excitation interval setter 590 has a configuration that omits the AND circuit 599 from the circuit depicted in FIG. 11A. Consequently, the output Ea of the OR circuit 598 serves as the excitation interval signal Ea for distinguishing excitation intervals from non-excitation intervals.

Figures 16A, 16B, 16C, 16D, 16E:
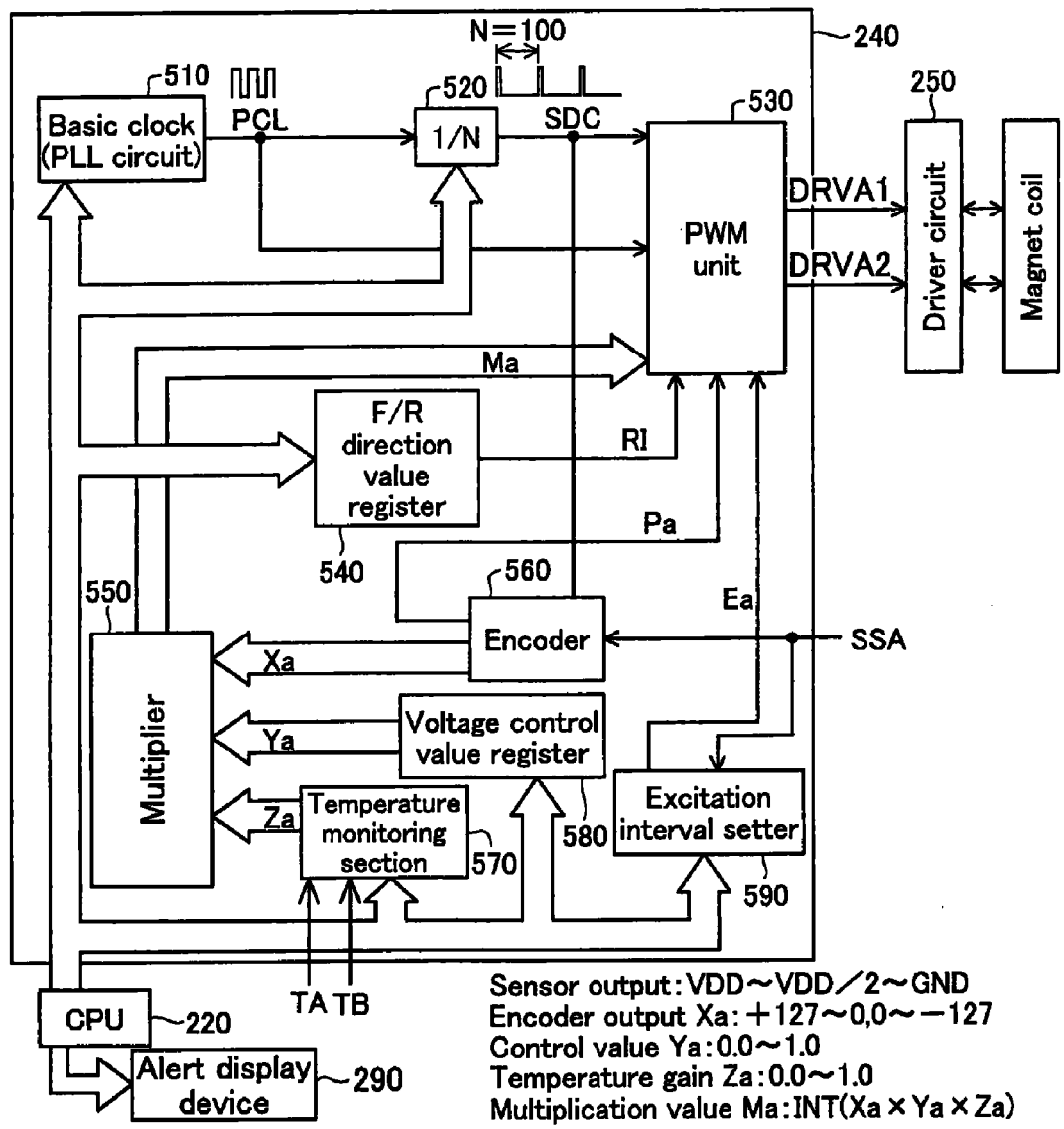
FIGS. 16A to 16E show the internal configuration and operation of a drive signal generator.

With the brushless motor of the present embodiment discussed above, overheating of the coils 11, 12 of each phase is prevented through the workings of the temperature sensors 50A, 50B and the temperature monitoring section 570 (FIG. 16A). Consequently, there is no need to provide a current limiting circuit as in the prior art. Moreover, since current is not limited unduly at startup, it is possible to prevent the problem of an inability to generate sufficient torque at startup as well. Specifically, where power is supplied by rectangular wave driving in regions of change of the S and N magnetic poles as is the conventional practice, short-circuit current will be produced and a current limiting circuit will be required. In the present embodiment, however, as shown in FIGS. 7A to 7C, in these regions of change, supply of power by sine wave driving is inhibited and short-circuit current is not produced, so there is no need for a current limiting circuit. Moreover, since the startup current for producing startup torque and the impedance of the magnetic coils are determined by the design, there is no need to design overcurrent protection. Furthermore, in the event that overcurrent not anticipated in the design should occur, overcurrent persisting for longer than the planned time will be suppressed through temperature detection.

Figure 19:
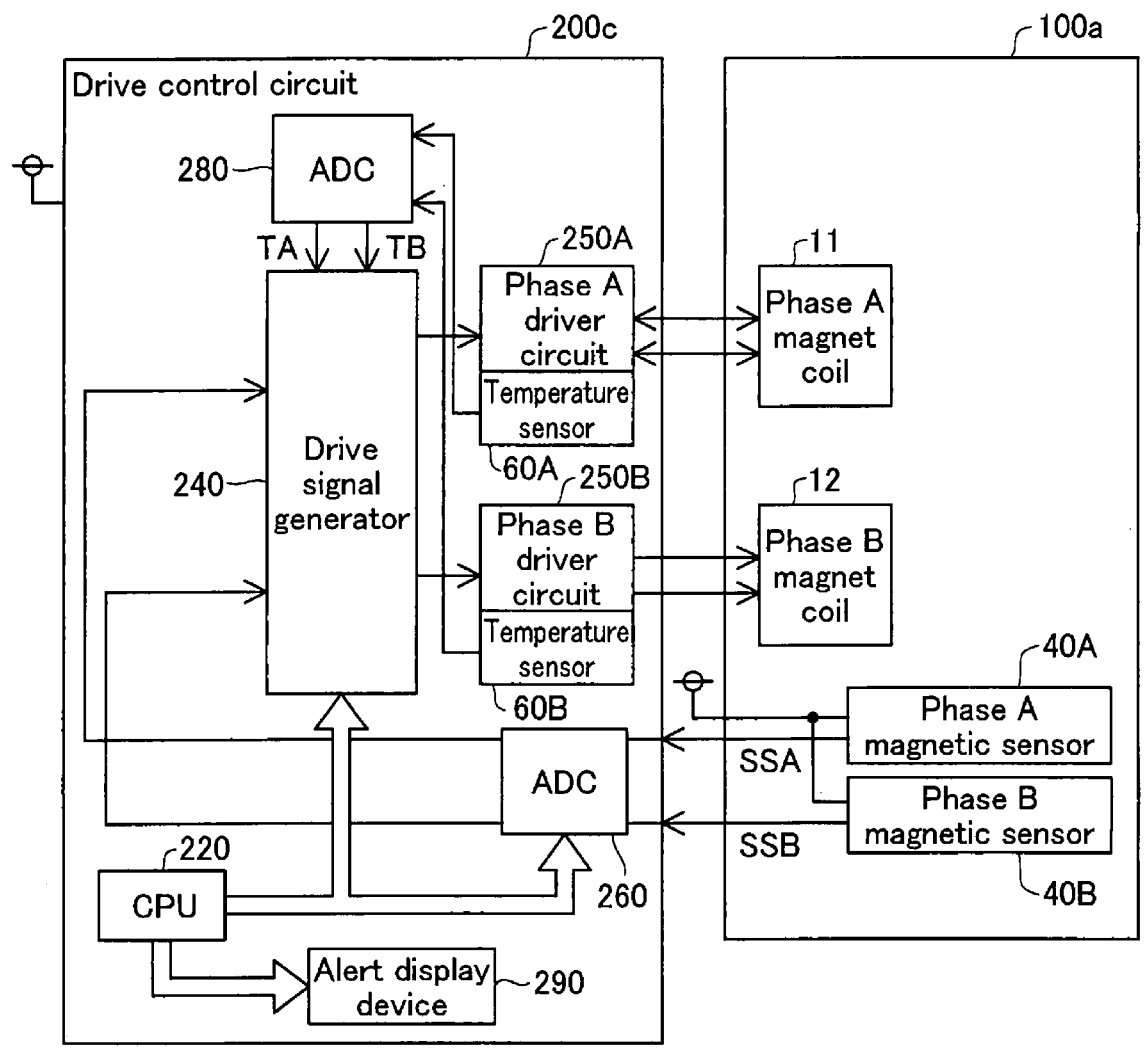
FIG. 19 is a block diagram showing yet another configuration of a drive control circuit of a brushless motor.

FIG. 19 is a block diagram showing yet another exemplary configuration of a drive control circuit of a brushless motor. This drive control circuit 200c is similar to the drive control circuit 200b shown in FIG. 14, but the driver circuits 250A, 250B are respectively furnished with temperature sensors 60A, 60B. Also, the temperature sensors 50A, 50B of the motor unit 100 of FIG. 14 have been omitted from the motor unit 100a. The configuration is otherwise the same as that of the circuit shown in FIG. 14. The temperature sensors 60A, 60B are for the purpose of detecting temperature of the driving elements (driving transistors) that make up the driver circuits 250A, 250B. Effects analogous to those of the preceding embodiments discussed above are obtainable with this drive control circuit as well.

D. Modification Examples

The present invention is not limited to the embodiments described hereinabove, and may be reduced to practice in various other ways without departing from the spirit thereof. Modifications such as the following would be possible, for example.

D1. Modification Example 1

In the embodiment discussed in FIGS. 1 through 13B, when the detection target temperature (the coil temperature or driving element temperature) exceeds a prescribed threshold value temperature, supply of application to the coils is halted; however, it is possible to instead drop the effective driving voltage applied to the coils. Such control may be accomplished, for example, by dispensing with the AND circuit 599 in the configuration of the excitation interval setter 590, and instead providing a resistance adjusting circuit for readjusting the resistance Rv of the variable resistor 592 depending on the level of the overheat limiting signal OHL.

Limitation of the effective value of driving voltage to the coils may also be accomplished using a circuit configuration besides the excitation interval setter 590. For example, it is possible to constitute the PWM unit 530 (FIG. 6A) so that the PWM unit 530 halts the PWM control operation when the overheat limiting signal OHL is L level.

In the embodiments discussed in FIGS. 14 through 19, the level of the temperature monitoring signal Za is modified depending on the detection target temperature (the coil temperature or driving element temperature), and the effective driving voltage of the coils is reduced in accordance therewith; however, some other circuit configuration may be employed to drop the effective driving voltage applied to the coils. Such a circuit configuration may be achieved, for example, by providing the configuration of the excitation interval setter 590 shown in FIG. 18 with a resistance adjusting circuit for readjusting the resistance Rv of the variable resistor 592 depending on the level of the detection target temperature (of the temperature monitoring signal Za).

D2. Modification Example 2

While analog magnetic sensors are employed in the preceding embodiments, it is possible to use digital magnetic sensors having multivalue analog-like output, instead of analog magnetic sensors. Like analog magnetic sensors, digital magnetic sensors having multivalue analog-like output also have an output signal that changes in analog fashion. Herein, an "output signal that changes in analog fashion" refers in the broad sense to include both analog output signals and multilevel digital output signals having three or more levels, not to On/Off binary output.

D3. Modification Example 3

It is possible to employ as the PWM circuit various circuit configurations besides that shown in FIG. 6A. For example, it is possible to utilize a circuit that performs PWM control by comparing the sensor output with a triangular reference wave. It is also possible to generate drive signals by some method besides PWM control. Circuits that generate drive signals by some method besides PWM control may be employed as well. For example, a circuit that amplifies sensor output to generate analog drive signals may be employed.

D4. Modification Example 4

In the preceding embodiments, the example of a two-pole, two-phase motor is described, but any number may be employed for the number of poles and for the number of phases of the motor, respectively.

D5. Modification Example 5

The present invention is applicable to motors of various devices such as fan motors, clocks (for driving the hands), drum type washing machines (single rotation), jet coasters, vibrating motors, and the like. Fan motors may be employed as fan motors in various devices, for example, in digital display devices, automotive on-board instruments, fuel cell equipped PCs, fuel cell equipped digital cameras, fuel cell equipped video cameras, fuel cell equipped mobile phones, and other such fuel cell equipped devices, as well as in projectors and so on. It is furthermore possible for the motor of the present invention to be utilized as a motor for household electronic appliances and electronic devices of various kinds. For example, the motor according to the present invention may be employed as a spindle motor in an optical storage device, magnetic storage device, polygon mirror drive device, or the like. It is furthermore possible for the motor of the present invention to be utilized as a motor for a moving body.

Figure 20:
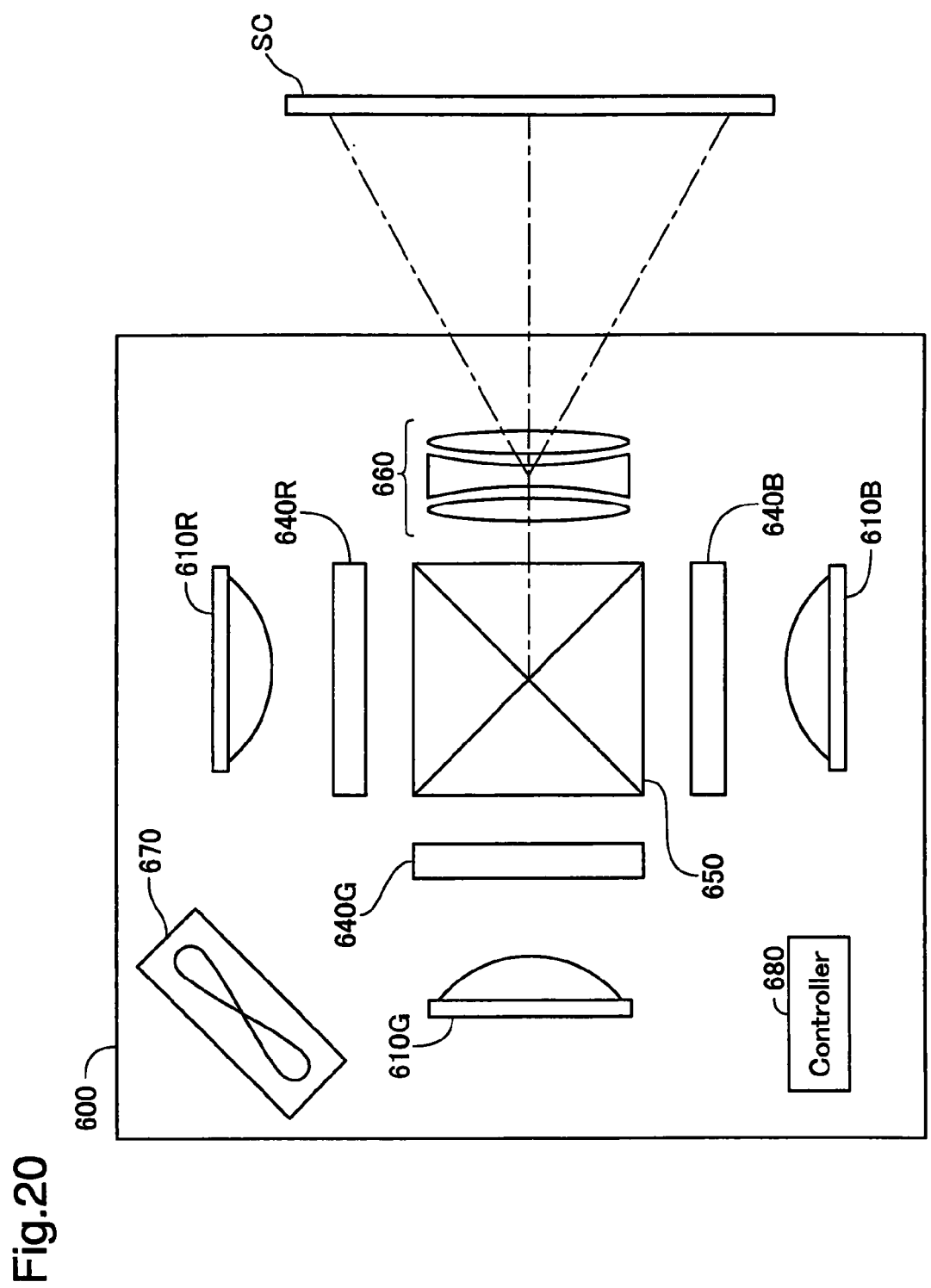
FIG. 20 is an illustration showing a projector that utilizes a motor according to an embodiment of the present invention.

FIG. 20 is an illustration showing a projector that utilizes a motor according to an embodiment of the present invention. This projector 600 has three light sources 610R, 610G, 610B for emitting colored light of the three colors red, green, and blue; three liquid crystal light valves 640R, 640G, 640B for respectively modulating colored light of the three colors; a cross dichroic prism 650 for synthesizing the modulated colored light of the three colors; a projecting lens system 660 for projecting the synthesized colored light of the three colors onto a screen SC; a cooling fan for cooling the projector interior; and a controller 680 for overall control of the projector 600. The various rotary type brushless motors discussed hereinabove may be used as the motor for driving the cooling fan 670.

Figure 21A:
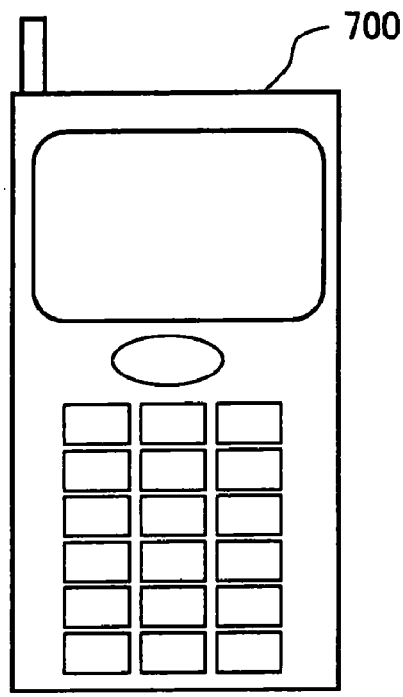
FIGS. 21A to 21C are illustrations showing a fuel cell type mobile phone that utilizes a motor according to an embodiment of the present invention.
Figure 21B:
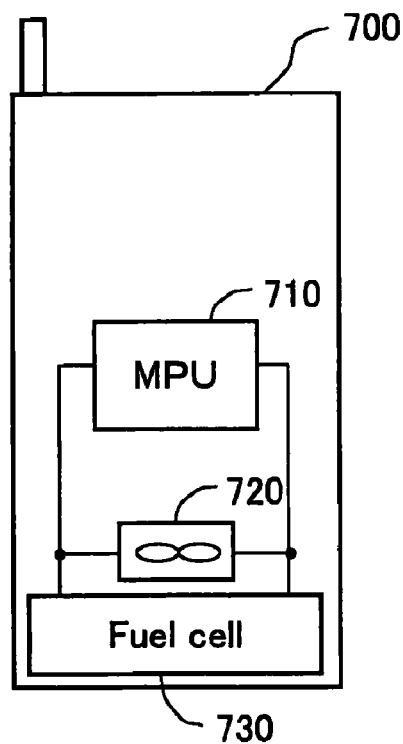
Figure 21C:
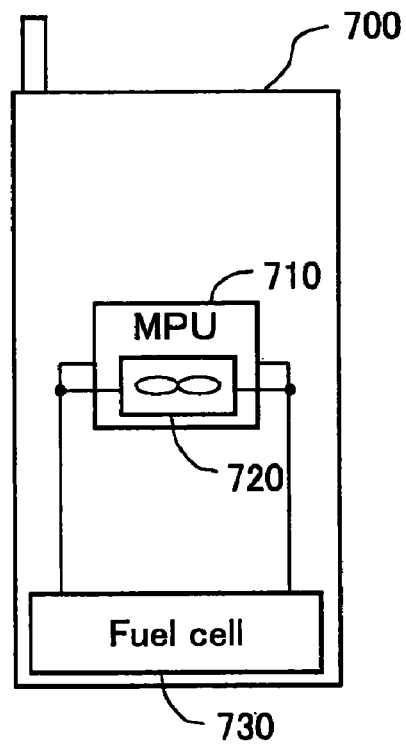

FIGS. 21A to 21C are illustrations showing a fuel cell equipped mobile phone that utilizes a motor according to an embodiment of the present invention. FIG. 21A depicts the mobile phone 700 in exterior view; and FIG. 21B depicts an exemplary internal configuration. The mobile phone 700 has an MPU 710 for controlling the operation of the mobile phone 700; a fan 720; and a fuel cell 730. The fuel cell 730 supplies power for the MPU 710 and the fan 720. The purpose of the fan 720 is to force outside air into the mobile phone 700 interior in order to supply air to the fuel cell 730, or to expel moisture produced by the fuel cell 730 from the mobile phone 700 interior to the outside. As shown in FIG. 21C, the fan 720 may be positioned on the MPU 710 so as to cool the MPU 710. The various rotary type brushless motors discussed hereinabove may be used as the motor for driving the fan 720.

Figure 22:
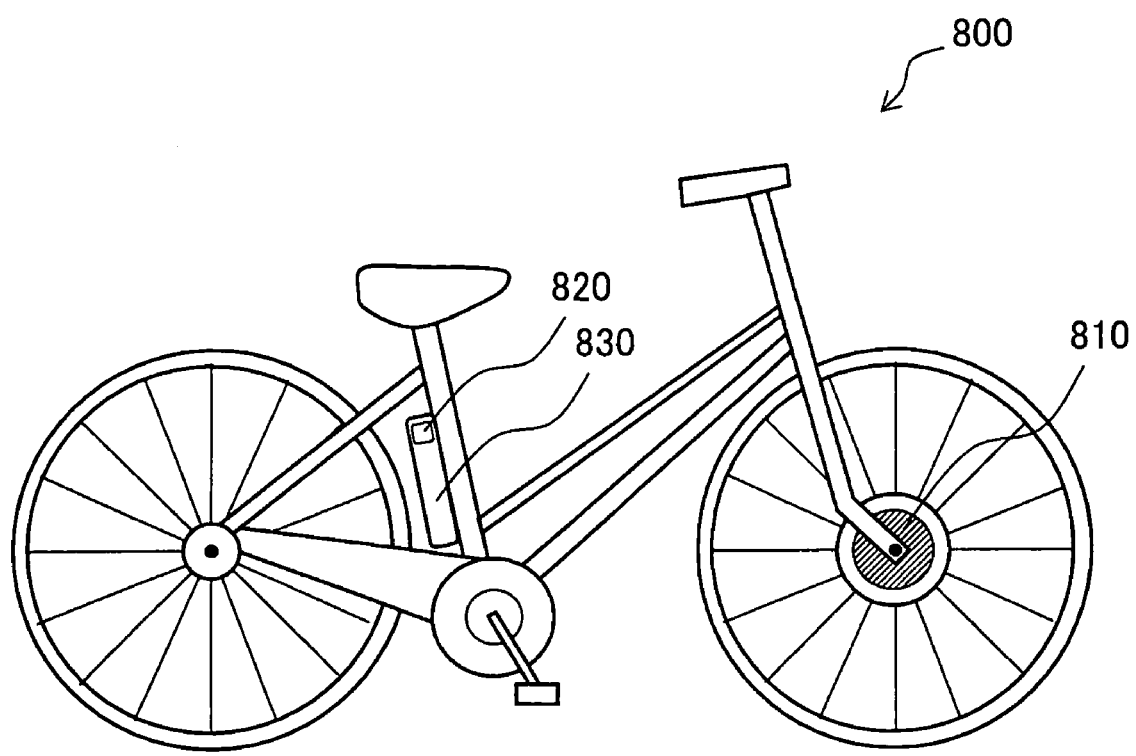
FIG. 22 is an illustration showing an electrically powered bicycle (electric power assisted bicycle) that utilizes a motor/generator according to an embodiment of the present invention.

FIG. 22 is an illustration showing an electrically powered bicycle (electric power assisted bicycle) that utilizes a motor/generator according to an embodiment of the present invention. This bicycle 800 is provided with a motor 810 on its front wheel; and with a control circuit 820 and a rechargeable battery 830 disposed on the frame below the saddle. The motor 810 uses power from the rechargeable battery 830 to drive the front wheel, thereby assisting travel. During braking, regenerative power from the motor 810 is used to charge the rechargeable battery 830. The control circuit 820 is a circuit for controlling driving and regeneration of the motor. The various rotary type brushless motors discussed hereinabove may be used as the motor 810.

What is claimed is:

1. A brushless motor comprising:
a coil array having a plurality of magnet coils;
a magnet array having a plurality of permanent magnets;
a magnetic sensor for detecting a relative position of the magnet array and the coil array;
a drive control circuit for utilizing an output of the magnetic sensor and driving the coil array using a driving element; and
a temperature sensor for detecting a detection target temperature associated with either a coil temperature of the coil array or a temperature of the driving element,
wherein the drive control circuit reduces an effective value of a driving voltage supplied to the coil array to be a non-zero value when the detection target temperature detected by the temperature sensor has exceeded a prescribed first threshold value,
wherein the drive control circuit reduces the effective value of the driving voltage with a reduction step such that the reduction step of the effective value becomes greater as the detection target temperature becomes higher,
wherein the drive control circuit includes:
a driver circuit including a plurality of drive transistors for supplying electrical current to the coil array; and
a drive signal generating circuit for generating a drive signal that controls the plurality of drive transistors of the driver circuit;
wherein the drive signal generating circuit includes:
a temperature monitoring circuit for generating, based on the output of the temperature sensor, a temperature monitoring signal whose signal level changes depending on the detection target temperature;
a waveform signal generator for generating, based on at least the temperature monitoring signal and the output of the magnetic sensor, a waveform signal that exhibits change identical to analog change in the output of the magnetic sensor, and having amplitude proportional to a signal level of the temperature monitoring signal; and
a PWM control circuit for executing PWM control utilizing the waveform signal, and generating the drive signal which exhibits change in effective voltage identical to change in the waveform signal, and
wherein the waveform signal generator sets an amplitude of the waveform signal based not only on the temperature monitoring signal, but also on an externally provided control value of operating voltage of the brushless motor.

2. The brushless motor according to claim 1,
wherein the drive signal generating circuit includes:
an overheat limiting circuit for generating, based on the output of the temperature sensor, an overheat limiting signal indicating whether or not the detection target temperature has exceeded the prescribed first threshold value;
an excitation interval setter for setting, based on at least the overheat limiting signal, an excitation interval during which the coil array will be excited, and a non-excitation interval during which the coil array will not be excited; and
the PWM control circuit executes PWM control utilizing analog change in the output of the magnetic sensor, and supplies a PWM signal to the bridge circuit during the excitation interval while halting supply of the PWM signal during the non-excitation interval, and
wherein the excitation interval setter shortens the excitation interval and extends the non-excitation interval when the overheat limiting signal indicates that the detection target temperature has exceeded the prescribed first threshold value.

3. The brushless motor according to claim 2, wherein
the excitation interval setter sets the excitation interval and the non-excitation interval based not only on the overheat limiting signal, but also on the externally provided control value of operating voltage of the brushless motor.

4. The brushless motor according to claim 3, wherein the excitation interval setter includes:
a first interval setting section for setting the excitation interval and the non-excitation interval based on the control value of operating voltage of the brushless motor, and outputting an excitation interval signal that indicates the excitation interval and the non-excitation interval; and
a logic circuit for taking a logical AND of the excitation interval signal and the overheat limiting signal, and presenting the result of the logical AND operation to the PWM control circuit.

5. The brushless motor according to claim 1, wherein
the drive control circuit halts supply of the driving voltage to the coil array when the detection target temperature has exceeded a prescribed second threshold value greater than the first threshold value.

6. The brushless motor according to claim 1, wherein
the temperature sensor is included within a power semiconductor element on which the driving element is mounted.

7. The brushless motor according to claim 1, wherein
the temperature sensor is disposed on a radiator member provided to the driving element.

8. A device comprising:
the brushless motor according to claim 1; and
a driven member driven by the brushless motor.

9. The device according to claim 8, wherein the device is an electronic device.

10. The device according to claim 8, wherein
the device is a projector.

11. The device according to claim 8, wherein
the device is a fuel cell-powered device equipped with a fuel cell for supplying power to the brushless motor.

12. A method of controlling a brushless motor including a coil array having a plurality of magnet coils, a magnet array having a plurality of permanent magnets, and a temperature sensor for detecting a detection target temperature associated with either a coil temperature of the coil array or a temperature of a driving element that drives the coil array, the method comprising the steps of:
detecting a relative position of the magnet array and the coil array with a magnetic sensor; and
reducing an effective value of a driving voltage supplied to the coil array to be a non-zero value when the detection target temperature detected by the temperature sensor has exceeded a prescribed first threshold value,
wherein the effective value of the driving voltage is reduced with a reduction step such that the reduction step of the effective value becomes greater as the detection target temperature becomes higher,
wherein a drive control circuit utilizes an output of the magnetic sensor and drives the coil array using the driving element by:
supplying electrical current from a plurality of drive transistors to the coil array; and generating a drive signal that controls the plurality of drive transistors;

wherein the drive signal is generated by:

generating, based on the output of the temperature sensor, a temperature monitoring signal whose signal level changes depending on the detection target temperature;

generating, based on at least the temperature monitoring signal and the output of the magnetic sensor, a waveform signal that exhibits change identical to analog change in the output of the magnetic sensor, and having amplitude proportional to a signal level of the temperature monitoring signal; and executing PWM control utilizing the waveform signal, and generating the drive signal which exhibits change in effective voltage identical to change in the waveform signal, and wherein an amplitude of the waveform signal is set based not only on the temperature monitoring signal, but also on an externally provided control value of operating voltage of the brushless motor.

* * * * *